US012375521B2

(12) United States Patent
Jiao

(10) Patent No.: US 12,375,521 B2
(45) Date of Patent: Jul. 29, 2025

(54) TRAINING METHOD FOR DETECTION MODEL, SYSTEM, DEVICE, AND STORAGE MEDIUM

(71) Applicant: Huawei Technologies Co., Ltd., Shenzhen (CN)

(72) Inventor: Lijuan Jiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 18/180,960

(22) Filed: Mar. 9, 2023

(65) Prior Publication Data

US 2023/0231871 A1 Jul. 20, 2023

Related U.S. Application Data

(63) Continuation of application No. PCT/CN2021/089390, filed on Apr. 23, 2021.

(30) Foreign Application Priority Data

Sep. 10, 2020 (CN) .......................... 202010948783.1

(51) Int. Cl.
*H04L 29/06* (2006.01)
*G06N 20/00* (2019.01)
*H04L 9/40* (2022.01)

(52) U.S. Cl.
CPC ......... *H04L 63/1441* (2013.01); *G06N 20/00* (2019.01); *H04L 63/1416* (2013.01)

(58) Field of Classification Search
CPC ............ H04L 63/1441; H04L 63/1463; H04L 63/0263; H04L 63/126; H04L 63/10; H04L 63/20
See application file for complete search history.

(56) References Cited

U.S. PATENT DOCUMENTS

| 10,334,083 B2 * | 6/2019 | Katmor | .............. H04L 63/0236 |
| 10,530,787 B2 * | 1/2020 | Avrahami | .......... H04L 63/1441 |
| 2019/0068620 A1 | 2/2019 | Avrahami et al. | |

FOREIGN PATENT DOCUMENTS

| CN | 109165725 A | 1/2019 |
| CN | 109189825 A | 1/2019 |
| CN | 110288094 A | 9/2019 |
| CN | 110443063 A | 11/2019 |
| CN | 110572253 A | 12/2019 |
| CN | 110572382 A | 12/2019 |

(Continued)

*Primary Examiner* — Longbit Chai
(74) *Attorney, Agent, or Firm* — Slater Matsil, LLP

(57) ABSTRACT

This application provides a training method for a detection model, a system, a device, and a storage medium, belongs to the field of network security technologies, and further relates to application of an AI technology in the field of network security technologies. Some embodiments of this application provide a method for training a detection model by using federated learning. In the method, a gateway device serves as a participant of federated learning, and a server aggregates model parameters and delivers shared malicious samples for the gateway device. When the gateway device performs model training, the gateway device exchanges information such as the model parameters and the shared samples with the server, to obtain a detection model through training.

17 Claims, 11 Drawing Sheets

(56) References Cited

FOREIGN PATENT DOCUMENTS

| | | | |
|---|---|---|---|
| CN | 110620760 | A | 12/2019 |
| CN | 111176929 | A | 5/2020 |
| CN | 111275207 | A | 6/2020 |
| CN | 111356998 | A | 6/2020 |
| CN | 111428881 | A | 7/2020 |
| CN | 111444848 | A | 7/2020 |
| CN | 111476376 | A | 7/2020 |
| CN | 111477290 | A | 7/2020 |

* cited by examiner

TRAINING METHOD FOR DETECTION MODEL, SYSTEM, DEVICE, AND STORAGE MEDIUM

CROSS-REFERENCE TO RELATED APPLICATIONS

This application is a continuation of International Application No. PCT/CN2021/089390, filed on Apr. 23, 2021, which claims priority to Chinese Patent Application No. 202010948783.1, filed on Sep. 10, 2020. The disclosures of the aforementioned applications are hereby incorporated by reference in their entireties.

TECHNICAL FIELD

This application relates to the field of network security technologies, and further relates to application of an artificial intelligence (AI) technology in the field of network security technologies, and in particular, to a training method for a detection model, a system, a device, and a storage medium.

BACKGROUND

With the continuous development of an artificial intelligence (AI) technology, how to detect a malicious traffic flow using the AI technology has become a research hotspot in the field of network security. A basic principle of using the AI technology to identify a malicious traffic flow is that a computer uses a machine learning algorithm to perform model training on malicious samples and normal samples, to obtain a detection model. The machine learning algorithm is, for example, a convolutional neural network (CNN). In a model training process, the detection model can learn features of a malicious traffic flow through the malicious samples, and the detection model can learn features of a normal traffic flow through the normal samples. Therefore, in a prediction phase, the computer can automatically distinguish whether a traffic flow is a malicious traffic flow or a normal traffic flow through the detection model. A traffic flow is a series of packets from a source host to a destination. The destination is, for example, another host, a multicast group including a plurality of hosts, or a broadcast domain.

However, due to the difficulty in obtaining and calibrating malicious samples, malicious samples are often insufficient. If the malicious samples used for training the detection model are insufficient, an effect of training the detection model is affected. As a result, when the computer detects a traffic flow by using the detection model obtained through training, a false positive rate is relatively high, and an attack coverage rate is insufficient.

SUMMARY

Embodiments of this application provide a training method for a detection model, a system, a device, and a storage medium, to improve a model training effect, thereby helping improve performance of the detection model. The technical solutions are as follows.

According to a first aspect, a training method for a detection model is provided, and is described from a perspective of a gateway device participating in federated learning. In the method, a first gateway device obtains at least one traffic flow transmitted through the first gateway device; the first gateway device obtains a malicious sample set based on the at least one traffic flow, where a malicious sample included in the malicious sample set is metadata of a malicious traffic flow in the at least one traffic flow; the first gateway device obtains a first model parameter from a first server; the first gateway device performs model training based on the malicious sample set, a shared sample, and the first model parameter, to obtain a detection model after model training, where the shared sample is a malicious sample provided by the first server for each gateway device in a gateway device set, the gateway device set includes the first gateway device, the detection model is used by the first gateway device to detect whether a traffic flow subsequently transmitted through the first gateway device is malicious, and the detection model after model training includes a second model parameter; and the first gateway device sends the second model parameter to the first server.

In the foregoing method, because the gateway device not only calibrates a malicious sample by using a traffic flow transmitted by the gateway device, but also receives a shared malicious sample and a model parameter that are delivered by a server, the gateway device performs model training by using the locally calibrated malicious sample, and the malicious sample and the model parameter that are delivered by the server together, thereby alleviating a problem of insufficient malicious samples faced by the gateway device, and driving training of a detection model by using richer malicious samples. Therefore, this method can improve a model training effect, thereby helping improve performance of a detection model, helping reduce a false positive rate of detecting a traffic flow by using the detection model, and helping improve an attack coverage rate of detecting a traffic flow by using the detection model.

Optionally, the at least one traffic flow includes a first traffic flow, and that the first gateway device obtains a malicious sample set based on the at least one traffic flow includes: if the first traffic flow hits a blocking rule, the first gateway device determines metadata of the first traffic flow as the malicious sample, where the blocking rule is for blocking a malicious traffic flow.

The foregoing provides a technical means for calibrating a malicious sample on a gateway device. Because the gateway device obtains, by using the blocking rule, malicious samples from the traffic flow transmitted by the gateway device, the complexity of obtaining malicious samples is reduced, which helps enrich malicious samples in the malicious sample set.

Optionally, the at least one traffic flow includes a second traffic flow, and that the first gateway device obtains a malicious sample set based on the at least one traffic flow includes: if the second traffic flow does not hit a blocking rule, the first gateway device inputs metadata of the second traffic flow into a detection model before model training, where the blocking rule is for blocking a malicious traffic flow, and when the first gateway device performs the model training for the first time, the detection model before model training is an initial detection model; if an output result of the detection model before model training indicates that the second traffic flow is a suspicious traffic flow, the first gateway device analyzes the second traffic flow; and if it is determined through analysis that the second traffic flow is a malicious traffic flow, the first gateway device determines the metadata of the second traffic flow as the malicious sample.

The foregoing provides a technical means for calibrating a malicious sample on a gateway device. When a traffic flow does not hit the blocking rule, the gateway device uses the two means of model and local analysis to jointly calibrate malicious samples, improving the accuracy of malicious samples.

Optionally, the output result of the detection model before model training further indicates a probability value that the second traffic flow is a malicious traffic flow, and that the first gateway device analyzes the second traffic flow includes: if the output result of the detection model before model training indicates that the probability value that the second traffic flow is a malicious traffic flow is greater than a threshold, the first gateway device determines that the second traffic flow is a malicious traffic flow, where the probability value indicates a possibility that the second traffic flow is a malicious traffic flow.

Optionally, that the first gateway device analyzes the second traffic flow includes: if a domain generation algorithm DGA event generated in a first time period exists, the first gateway device determines that the second traffic flow is a malicious traffic flow, where the first time period is a historical time period ending at a moment at which the first gateway device obtains the second traffic flow, an event source included in the DGA event is a first host, the first host is a source host of the second traffic flow, and the DGA event indicates that the first host accesses a DGA domain name.

Optionally, that the first gateway device analyzes the second traffic flow includes: if an intranet brute force cracking event generated in a second time period exists, the first gateway device determines that the second traffic flow is a malicious traffic flow, where the second time period is a historical time period ending at a moment at which the first gateway device obtains the second traffic flow, the intranet brute force cracking event indicates that a brute force cracking attack targeting an intranet in which a first host is located occurs, and the first host is a source host of the second traffic flow; if a sensitive information leakage event generated in a second time period exists, the first gateway device determines that the second traffic flow is a malicious traffic flow, where the sensitive information leakage event indicates that a behavior of sending sensitive information on a first host to an external network occurs; or if an external network distributed denial of service DDoS event generated in a second time period exists, the first gateway device determines that the second traffic flow is a malicious traffic flow, where the external network DDoS event indicates that a DDoS attack initiated by an intranet in which a first host is located to an external network occurs.

Optionally, that the first gateway device analyzes the second traffic flow includes: if an output result of the detection model before model training in a third time period for metadata of a target traffic flow is periodic, the first gateway device determines that the second traffic flow is a malicious traffic flow, where the third time period is a historical time period ending at a moment at which the first gateway device obtains the second traffic flow, the target traffic flow includes at least one traffic flow that uses a first host as a source host, and the first host is a source host of the second traffic flow.

The foregoing provides a plurality of technical means for the gateway device to locally analyze and calibrate malicious samples, helping resolve a problem that malicious samples are difficult to obtain and helping collect more high-quality malicious samples.

Optionally, the at least one traffic flow includes a third traffic flow, and that the first gateway device obtains a malicious sample set based on the at least one traffic flow includes: if the third traffic flow does not hit a blocking rule and it is determined through analysis that the third traffic flow is not a malicious traffic flow, the first gateway device sends context information of the third traffic flow to a second server, where the blocking rule is for blocking a malicious traffic flow, and the context information includes at least one of metadata of the third traffic flow or a packet capture PCAP packet of the third traffic flow; the first gateway device receives an analysis result obtained from the second server based on the context information; and if the analysis result indicates that the third traffic flow is a malicious traffic flow, the first gateway device determines the metadata of the third traffic flow as the malicious sample.

In the foregoing method, threat analysis is performed on a cloud to assist the gateway device in calibrating malicious samples, thereby reducing the complexity of calibrating malicious samples, and helping improve the accuracy of the determined malicious samples.

Optionally, the at least one traffic flow includes a third traffic flow, and that the first gateway device obtains a malicious sample set based on the at least one traffic flow includes: if the third traffic flow does not hit a blocking rule and it is determined through analysis that the third traffic flow is not a malicious traffic flow, the first gateway device queries first threat intelligence based on a destination Internet Protocol IP address included in the third traffic flow or a source IP address included in the third traffic flow, where the first threat intelligence includes at least one malicious IP address; and if the destination IP address or the source IP address hits a malicious IP address in the first threat intelligence, the first gateway device determines metadata of the third traffic flow as the malicious sample; if the third traffic flow does not hit a blocking rule and it is determined through analysis that the third traffic flow is not a malicious traffic flow, the first gateway device queries second threat intelligence based on a target domain name corresponding to the third traffic flow, where the target domain name is a domain name that the third traffic flow requests to access, and the second threat intelligence includes at least one malicious domain name; and if the target domain name hits a malicious domain name in the second threat intelligence, the first gateway device determines metadata of the third traffic flow as the malicious sample; or if the third traffic flow does not hit a blocking rule and it is determined through analysis that the third traffic flow is not a malicious traffic flow, the first gateway device queries third threat intelligence based on a file identifier corresponding to the third traffic flow, where the file identifier is for identifying a file included in the third traffic flow, and the third threat intelligence includes at least one malicious file identifier; and if the file identifier hits a malicious file identifier in the third threat intelligence, the first gateway device determines metadata of the third traffic flow as the malicious sample.

In the foregoing method, the traffic flow is analyzed by using threat intelligence, which helps improve the accuracy of malicious sample calibration.

Optionally, before the first gateway device obtains a first model parameter from a first server, the method further includes: the first gateway device receives the shared sample and a hyperparameter of the detection model from the first server, where the hyperparameter includes a learning rate of the detection model and an initial parameter of the detection model, the learning rate is for controlling a difference between the second model parameter and a model parameter of the detection model before model training, and the initial parameter is for generating the initial detection model.

Optionally, after the first gateway device obtains at least one traffic flow transmitted through the first gateway device, the method further includes: the first gateway device obtains a normal sample set based on the at least one traffic flow, where a normal sample included in the normal sample set is metadata of a normal traffic flow in the at least one traffic flow; and that the first gateway device performs model training based on the malicious sample set, a shared sample, and the first model parameter includes: the first gateway device performs model training based on the malicious sample set, the shared sample, the first model parameter, and the normal sample set.

Optionally, before the first gateway device performs model training based on the malicious sample set, the shared sample, the first model parameter, and the normal sample set, the method further includes: if a quantity of occurrence times of a first normal sample in a fourth time period exceeds a first threshold, the first gateway device removes the first normal sample from the normal sample set, where the fourth time period is a historical time period to which a moment at which the first gateway device obtains the first normal sample belongs; and if a quantity of occurrence times of a first malicious sample in a fifth time period exceeds a second threshold, the first gateway device removes the first malicious sample from the malicious sample set, where the second threshold is less than the first threshold, and the fifth time period is a historical time period to which a moment at which the first gateway device obtains the first malicious sample belongs.

The foregoing method helps resolve a problem that a quantity of local malicious samples and a quantity of local normal samples of the gateway device are unbalanced, and helps balance the local malicious samples and the local normal samples of the first gateway device as much as possible. Therefore, poor performance of a model caused by difficulty in learning knowledge included in a smaller quantity of samples is avoided, and performance of a detection model obtained through training is improved.

According to a second aspect, a training method for a detection model is provided. In the method, a first server receives a first model parameter from a first gateway device in a gateway device set and a second model parameter from a second gateway device in the gateway device set, where the first model parameter is a parameter of a first detection model, the first detection model is configured to detect whether a traffic flow transmitted through the first gateway device is malicious, the second model parameter is a parameter of a second detection model, and the second detection model is configured to detect whether a traffic flow transmitted through the second gateway device is malicious; the first server performs aggregation processing based on the first model parameter and the second model parameter to obtain a third model parameter; and the first server sends the third model parameter to at least one gateway device in the gateway device set.

In the foregoing method, a server receives a model parameter uploaded by each gateway device, performs aggregation processing on the model parameter uploaded by each gateway device, and delivers the model parameter obtained after the aggregation processing to each gateway device, so that a gateway device performs model training by using the model parameter obtained after the aggregation processing, thereby improving a model training effect of the gateway device, and further improving performance of a detection model obtained through training.

Optionally, that the first server performs aggregation processing based on the first model parameter and the second model parameter to obtain a third model parameter includes: the first server obtains an average value of the first model parameter and the second model parameter; the first server obtains a variation of a model parameter based on the average value and a learning rate, where the variation is a product of the average value and the learning rate, and the learning rate is for controlling a difference between a model parameter of a detection model after model training and a model parameter of a detection model before model training; and the first server updates a historical model parameter based on the variation to obtain the third model parameter, where the third model parameter is a difference between the historical model parameter and the variation, and the historical model parameter is a model parameter sent by the first server to at least one gateway device in the gateway device set before the first server receives the first model parameter and the second model parameter.

Optionally, before the first server performs aggregation processing based on the first model parameter and the second model parameter, the method further includes: the first server determines a gateway device set participating in federated learning; and the first server sends a hyperparameter and a shared sample to at least one gateway device in the gateway device set, where the shared sample is a malicious sample provided by the server for each gateway device in the gateway device set, the hyperparameter includes an initial parameter and a learning rate, the initial parameter is an initial parameter of the first detection model and the second detection model, and the learning rate is a learning rate of the first detection model and the second detection model.

Optionally, before the first server sends a hyperparameter and a shared sample to at least one gateway device in the gateway device set, the method further includes: the first server runs a malicious file in a sandbox to obtain at least one packet capture PCAP packet; and the first server generates the shared sample based on the at least one PCAP packet.

According to a third aspect, a first gateway device is provided, and the first gateway device includes a function of implementing any one of the first aspect or the optional manners of the first aspect. The first gateway device includes at least one module, and the at least one module is configured to implement the training method for a detection model provided in any one of the first aspect or the optional manners of the first aspect.

In some embodiments, modules in the first gateway device are implemented through software, and the modules in the first gateway device are program modules. In some other embodiments, the modules in the first gateway device are implemented through hardware or firmware. For specific details of the first gateway device provided in the third aspect, refer to any one of the first aspect or the optional manners of the first aspect. Details are not described herein again.

According to a fourth aspect, a first server is provided, and the first server includes a function of implementing any one of the second aspect or the optional manners of the second aspect. The first server includes at least one module, and the at least one module is configured to implement the training method for a detection model provided in any one of the second aspect or the optional manners of the second aspect.

In some embodiments, modules in the first server are implemented through software, and the modules in the first server are program modules. In some other embodiments, the modules in the first server are implemented through hardware or firmware. For specific details of the first server provided in the fourth aspect, refer to any one of the second aspect or the optional manners of the second aspect. Details are not described herein again.

According to a fifth aspect, a first gateway device is provided, where the first gateway device includes a network interface, a memory, and a processor connected to the memory, where the network interface is configured to obtain at least one traffic flow transmitted through the first gateway device; the memory is configured to store program instructions; and the processor is configured to execute the program instructions, to cause the first gateway device to perform the following operations: obtaining a malicious sample set based on the at least one traffic flow, where a malicious sample included in the malicious sample set is metadata of a malicious traffic flow in the at least one traffic flow; obtaining a first model parameter from a first server; performing model training based on the malicious sample set, a shared sample, and the first model parameter, to obtain a detection model after model training, where the shared sample is a malicious sample provided by the first server for each gateway device in a gateway device set, the gateway device set includes the first gateway device, the detection model is used by the first gateway device to detect whether a traffic flow subsequently transmitted through the first gateway device is malicious, and the detection model after model training includes a second model parameter; and sending the second model parameter to the first server.

Optionally, the at least one traffic flow includes a first traffic flow, and the processor is configured to: if the first traffic flow hits a blocking rule, determine metadata of the first traffic flow as the malicious sample, where the blocking rule is for blocking a malicious traffic flow.

Optionally, the at least one traffic flow includes a second traffic flow, and the processor is configured to: if the second traffic flow does not hit a blocking rule, input metadata of the second traffic flow into a detection model before model training, where the blocking rule is for blocking a malicious traffic flow, and when the first gateway device performs the model training for the first time, the detection model before model training is an initial detection model; if an output result of the detection model before model training indicates that the second traffic flow is a suspicious traffic flow, analyze the second traffic flow; and if it is determined through analysis that the second traffic flow is a malicious traffic flow, determine the metadata of the second traffic flow as the malicious sample.

Optionally, the output result of the detection model before model training further indicates a probability value that the second traffic flow is a malicious traffic flow, and the processor is configured to: if the output result of the detection model before model training indicates that the probability value that the second traffic flow is a malicious traffic flow is greater than a threshold, determine that the second traffic flow is a malicious traffic flow, where the probability value indicates a possibility that the second traffic flow is a malicious traffic flow.

Optionally, the processor is configured to: if a domain generation algorithm DGA event generated in a first time period exists, determine that the second traffic flow is a malicious traffic flow, where the first time period is a historical time period ending at a moment at which the first gateway device obtains the second traffic flow, an event source included in the DGA event is a first host, the first host is a source host of the second traffic flow, and the DGA event indicates that the first host accesses a DGA domain name.

Optionally, the processor is configured to: if an intranet brute force cracking event generated in a second time period exists, determine that the second traffic flow is a malicious traffic flow, where the second time period is a historical time period ending at a moment at which the first gateway device obtains the second traffic flow, the intranet brute force cracking event indicates that a brute force cracking attack targeting an intranet in which a first host is located occurs, and the first host is a source host of the second traffic flow; if a sensitive information leakage event generated in a second time period exists, determine that the second traffic flow is a malicious traffic flow, where the sensitive information leakage event indicates that a behavior of sending sensitive information on a first host to an external network occurs; or if an external network distributed denial of service DDoS event generated in a second time period exists, determine that the second traffic flow is a malicious traffic flow, where the external network DDoS event indicates that a DDoS attack initiated by an intranet in which a first host is located to an external network occurs.

Optionally, the processor is configured to: if an output result of the detection model before model training in a third time period for metadata of a target traffic flow is periodic, determine that the second traffic flow is a malicious traffic flow, where the third time period is a historical time period ending at a moment at which the first gateway device obtains the second traffic flow, the target traffic flow includes at least one traffic flow that uses a first host as a source host, and the first host is a source host of the second traffic flow.

Optionally, the at least one traffic flow includes a third traffic flow, and the processor is configured to: if the third traffic flow does not hit a blocking rule and it is determined through analysis that the third traffic flow is not a malicious traffic flow, send context information of the third traffic flow to a second server, where the blocking rule is for blocking a malicious traffic flow, and the context information includes at least one of metadata of the third traffic flow or a packet capture PCAP packet of the third traffic flow; receive an analysis result obtained from the second server based on the context information; and if the analysis result indicates that the third traffic flow is a malicious traffic flow, determine the metadata of the third traffic flow as the malicious sample.

Optionally, the at least one traffic flow includes a third traffic flow, and the processor is configured to: if the third traffic flow does not hit a blocking rule and it is determined through analysis that the third traffic flow is not a malicious traffic flow, query first threat intelligence based on a destination Internet Protocol IP address included in the third traffic flow or a source IP address included in the third traffic flow, where the first threat intelligence includes at least one malicious IP address; and if the destination IP address or the source IP address hits a malicious IP address in the first threat intelligence, determine metadata of the third traffic flow as the malicious sample; if the third traffic flow does not hit a blocking rule and it is determined through analysis that the third traffic flow is not a malicious traffic flow, query second threat intelligence based on a target domain name corresponding to the third traffic flow, where the target domain name is a domain name that the third traffic flow requests to access, and the second threat intelligence includes at least one malicious domain name; and if the target domain name hits a malicious domain name in the second threat intelligence, determine metadata of the third traffic flow as the malicious sample; or if the third traffic flow does not hit a blocking rule and it is determined through analysis that the third traffic flow is not a malicious traffic flow, query third threat intelligence based on a file identifier corresponding to the third traffic flow, where the file identifier is for identifying a file included in the third traffic flow, and the third threat intelligence includes at least one malicious file identifier; and if the file identifier hits a malicious file identifier in the third threat intelligence, determine metadata of the third traffic flow as the malicious sample.

Optionally, the network interface is configured to receive the shared sample and a hyperparameter of the detection model from the first server, where the hyperparameter includes a learning rate of the detection model and an initial parameter of the detection model, the learning rate is for controlling a difference between the second model parameter and a model parameter of the detection model before model training, and the initial parameter is for generating the initial detection model.

Optionally, the processor is further configured to: obtain a normal sample set based on the at least one traffic flow, where a normal sample included in the normal sample set is metadata of a normal traffic flow in the at least one traffic flow; and perform model training based on the malicious sample set, the shared sample, the first model parameter, and the normal sample set.

Optionally, the processor is further configured to: if a quantity of occurrence times of a first normal sample in a fourth time period exceeds a first threshold, remove the first normal sample from the normal sample set, where the fourth time period is a historical time period to which a moment at which the first gateway device obtains the first normal sample belongs; and if a quantity of occurrence times of a first malicious sample in a fifth time period exceeds a second threshold, remove the first malicious sample from the malicious sample set, where the second threshold is less than the first threshold, and the fifth time period is a historical time period to which a moment at which the first gateway device obtains the first malicious sample belongs.

According to a sixth aspect, a first server is provided, where the first server includes a network interface, a memory, and a processor connected to the memory, where the network interface is configured to receive a first model parameter from a first gateway device in a gateway device set and a second model parameter from a second gateway device in the gateway device set, where the first model parameter is a parameter of a first detection model, the first detection model is configured to detect whether a traffic flow transmitted through the first gateway device is malicious, the second model parameter is a parameter of a second detection model, and the second detection model is configured to detect whether a traffic flow transmitted through the second gateway device is malicious; the memory is configured to store program instructions; and the processor is configured to execute the program instructions, to cause the first server to perform the following operations: performing aggregation processing based on the first model parameter and the second model parameter to obtain a third model parameter; and sending the third model parameter to at least one gateway device in the gateway device set.

Optionally, the processor is configured to: obtain an average value of the first model parameter and the second model parameter; obtain a variation of a model parameter based on the average value and a learning rate, where the variation is a product of the average value and the learning rate, and the learning rate is for controlling a difference between a model parameter of a detection model after model training and a model parameter of a detection model before model training; and update a historical model parameter based on the variation to obtain the third model parameter, where the third model parameter is a difference between the historical model parameter and the variation, and the historical model parameter is a model parameter sent by the first server to at least one gateway device in the gateway device set before the first server receives the first model parameter and the second model parameter.

Optionally, the processor is further configured to: determine a gateway device set participating in federated learning; and send a hyperparameter and a shared sample to at least one gateway device in the gateway device set, where the shared sample is a malicious sample provided by the server for each gateway device in the gateway device set, the hyperparameter includes an initial parameter and a learning rate, the initial parameter is an initial parameter of the first detection model and the second detection model, and the learning rate is a learning rate of the first detection model and the second detection model.

Optionally, the processor is configured to: run a malicious file in a sandbox to obtain at least one packet capture PCAP packet; and generate the shared sample based on the at least one PCAP packet.

According to a seventh aspect, a computer-readable storage medium is provided. The storage medium stores at least one instruction, and the instruction is read by a processor, to cause a first gateway device to perform the training method for a detection model provided in any one of the first aspect or the optional manners of the first aspect.

According to an eighth aspect, a computer-readable storage medium is provided. The storage medium stores at least one instruction, and the instruction is read by a processor, to cause a first server to perform the training method for a detection model provided in any one of the second aspect or the optional manners of the second aspect.

According to a ninth aspect, a computer program product is provided. The computer program product includes computer instructions, and the computer instructions are stored in a computer-readable storage medium. A processor of a first gateway device reads the computer instructions from the computer-readable storage medium, and the processor executes the computer instructions, to cause the first gateway device to perform the training method for a detection model provided in any one of the first aspect or the optional manners of the first aspect.

According to a tenth aspect, a computer program product is provided. The computer program product includes computer instructions, and the computer instructions are stored in a computer-readable storage medium. A processor of a first server reads the computer instructions from the computer-readable storage medium, and the processor executes the computer instructions, to cause the first server to perform the training method for a detection model provided in any one of the second aspect or the optional manners of the second aspect.

According to an eleventh aspect, a chip is provided. When the chip is run on a first gateway device, the first gateway device is caused to perform the training method for a detection model provided in any one of the first aspect or the optional manners of the first aspect.

According to a twelfth aspect, a chip is provided. When the chip is run on a first server, the first server is caused to perform the training method for a detection model provided in any one of the second aspect or the optional manners of the second aspect.

According to a thirteenth aspect, a system is provided. The system includes a first gateway device and a first server, the first gateway device is configured to perform the method according to any one of the first aspect or the optional manners of the first aspect, and the first server is configured to perform the method according to any one of the second aspect or the optional manners of the second aspect.

Optionally, the system further includes a second server, and the second server is configured to: receive context information of a third traffic flow from the gateway device, perform analysis based on the context information to obtain an analysis result, and send the analysis result to the gateway device, where the context information includes at least one of metadata of the third traffic flow or a packet capture PCAP packet of the third traffic flow, and the analysis result is for indicating whether the third traffic flow is a malicious traffic flow.

DETAILED DESCRIPTION OF ILLUSTRATIVE EMBODIMENTS

Figure 1:
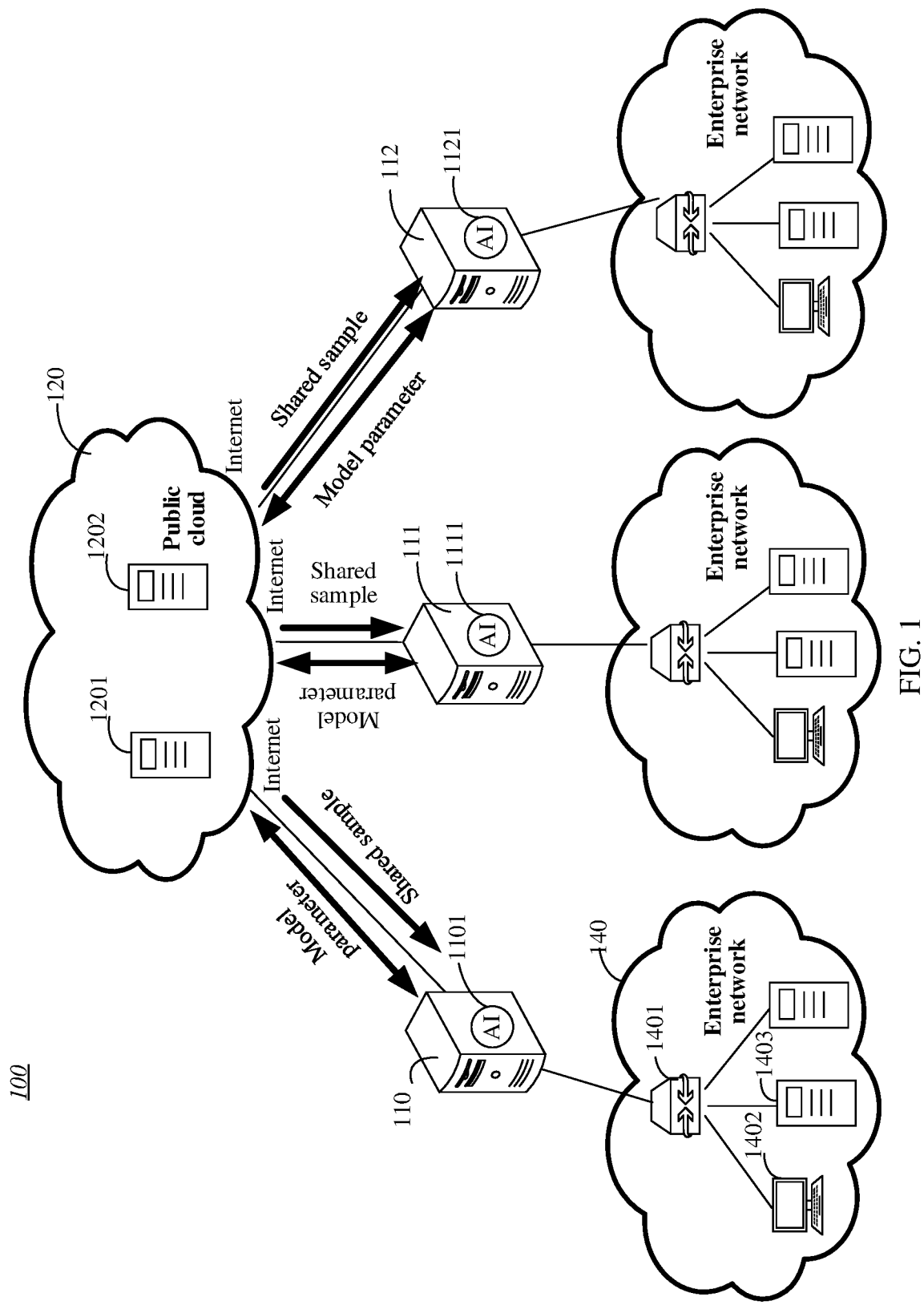
FIG. 1 is a schematic diagram of a system architecture 100 according to an embodiment of this application.

To make the objectives, technical solutions, and advantages of this application clearer, the following further describes implementations of this application in detail with reference to the accompanying drawings.

The method provided in embodiments of this application can be used in a scenario in which a traffic flow is detected based on AI in the field of network security. Specifically, the method in embodiments of this application can be used in a scenario in which a firewall detects, by using a detection model, whether a traffic flow is a malicious traffic flow. The following first briefly describes a scenario of detecting a malicious traffic flow.

A malicious traffic flow is a malicious traffic flow transmitted on a network. Malicious traffic flows are usually generated by various viruses, malicious crawlers, automatons, and simulators. Malicious traffic flows can trigger network attacks, service attacks, and malicious crawlers. For example, a malicious traffic flow is a hypertext transfer protocol (HTTP) traffic flow for triggering a command and control (C&C) attack. For brevity, the HTTP traffic flow triggering a C&C attack is referred to as a C&C traffic flow below. A C&C attack is an important phase in an advanced persistent threat (APT) attack. Therefore, detection of a malicious traffic flow is a crucial link in security threat detection.

According to a technical curve graph of Gartner (an information technology research and analysis company), the application of artificial intelligence (AI) in the field of network security has entered a mature phase. However, there are still two difficulties in using AI to detect security threats in the industry. One difficulty is that, different from the video field, data of malicious traffic flows is difficult to obtain and calibrate, resulting in insufficient malicious samples required by AI. The other difficulty is that it has become a global trend to pay attention to data privacy and security issues. Many enterprises prohibit traffic flow data of their own networks from being shared by other enterprises due to privacy and security concerns. As a result, it is difficult to collect data of traffic flows generated by industry applications executing services, further resulting in insufficient normal samples required by AI. Due to insufficient samples, the performance of a model obtained based on AI training is affected. As a result, a low false positive rate of the model cannot be ensured.

Currently, security gateway devices, such as next generation firewalls (NGFW) and probes, have been basically deployed at the north-south egress, data centers, and branch access nodes of various enterprises. Data of traffic flows generated by normal services in the industry and data of malicious traffic flows are stored on the gateway devices. As a result, data islands are formed, and AI models cannot be generated through global aggregation. Therefore, how to generate AI models based on data of all parties and deploy the models in a customer environment to accurately detect more threats while meeting data privacy, security, and supervision requirements is a problem that needs to be considered currently.

Conventionally, there are three methods to obtain samples.

Method one: Obtain samples through service purchase or open source download. For example, by purchasing virustotal (a free analysis service for viruses, worms, Trojan horses, and various malware, referred to as VT), malicious samples and normal samples are obtained. However, there are three problems with purchasing samples through services.

Problem 1: Malicious samples and normal samples are generally unbalanced. For example, there are a large quantity of malicious samples, and there are a small quantity of normal samples such as industry application samples.

Problem 2: The timeliness of samples cannot be ensured.

Problem 3: Many types of malicious samples (such as malicious samples of C&C traffic flows) cannot be obtained because no service purchase method is available.

Method two: Obtain samples by exchanging with friendly vendors. However, a problem existing in the method two is that a price of purchasing samples is high, and generally, the quality of exchanged samples cannot be ensured.

Method three: Obtain malicious samples on the live network through cloud services. However, a problem of the method three is that a small quantity of malicious samples can be obtained. In addition, because user privacy needs to be ensured, normal samples cannot be obtained.

However, in this embodiment of this application, by using a federated learning architecture, a gateway device serves as a participant of federated learning, and a federated learning server is deployed on a cloud. The gateway device locally performs model training, and the federated learning server on the cloud aggregates model parameters, so as to resolve the problem of data islands. In addition, improvements are made in how the gateway device determines a malicious sample and how to resolve a problem of unbalanced quantities of malicious samples and normal samples faced by federated learning.

The following specifically describes the technical solutions provided in embodiments of this application from a plurality of perspectives based on a sequence of a system architecture, hardware structures of various devices in the system architecture, a detection model, a method on a model training side, and a method on a model application side.

The following describes a system architecture provided in embodiments of this application.

Refer to FIG. 1. An embodiment of this application provides a system architecture 100. The system architecture 100 is an example of a system architecture of training a detection model based on a federated learning architecture. The system architecture 100 mainly includes two types of nodes. One type of node is a plurality of gateway devices participating in federated learning, and the other type of node is a public cloud. For example, as shown in FIG. 1, the system architecture 100 includes a gateway device 110 participating in federated learning, a gateway device 111 participating in federated learning, a gateway device 112 participating in federated learning, and a public cloud 120. The gateway device 110, the gateway device 111, and the gateway device 112 each are connected to the public cloud 120 through a wireless network or a wired network. A quantity and a type of node devices participating in federated learning are not limited in this application. The gateway device 110, the gateway device 111, and the gateway device 112 are examples of the plurality of gateway devices participating in federated learning. For example, the devices participating in federated learning further include a router, a firewall device, and the like.

The following separately describes the plurality of gateway devices participating in federated learning and the public cloud 120.

1. A Plurality of Gateway Devices Participating in Federated Learning

The gateway device is configured to perform threat detection on a traffic flow transmitted in a network and serve as a participant of federated learning. Optionally, the gateway device may also be replaced with any one of a firewall, an intrusion detection system (IDS) device, an intrusion prevention system (IPS) device, a server, a host, or a personal computer. The following uses the gateway device 110 as an example to describe one gateway device in the plurality of gateway devices participating in federated learning.

The gateway device 110 is deployed between an enterprise network 140 and the Internet. The enterprise network 140 includes, for example, devices such as a switch 1401, a personal computer 1402, and a host 1403. The gateway device 110 is connected to the switch 1401, and the switch 1401 is connected to the personal computer 1402 and the host 1403. The switch 1401 is configured to forward data transmitted between a device such as the personal computer 1402 or the host 1403 and the gateway device 110.

In a process in which the gateway device 110 participates in federated learning, the gateway device 110 exchanges various information with the public cloud 120. Information exchanged between the gateway device 110 and the public cloud 120 includes a model parameter, a shared sample, and the like. The gateway device performs model training based on the information exchanged with the public cloud 120, to obtain a detection model 1101. The gateway device 110 can detect, by using the detection model 1101, whether a traffic flow transmitted through the gateway device 110 is malicious. For example, when the gateway device 110 receives a traffic flow transmitted between the enterprise network 140 and the Internet, the gateway device 110 can detect, by using the detection model 1101, whether the traffic flow transmitted between the enterprise network 140 and the Internet is malicious, so as to perform threat detection for the enterprise network 140 and perform security defense for the enterprise network 140. Similarly, the gateway device in obtains a detection model 1111 through training by interacting with the public cloud 120, and the gateway device 112 obtains a detection model 1121 through training by interacting with the public cloud 120.

In some embodiments, different gateway devices participating in federated learning are separately deployed between enterprise networks in different industries and the Internet, so that the different gateway devices can use data of different industries as samples to participate in model training. For example, the gateway device 110 is deployed between an enterprise network in the financial industry or the securities industry and the Internet; or the gateway device 111 is deployed between an enterprise network in the energy industry and the Internet; the gateway device 112 is deployed between a government network and the Internet; and some other gateway devices are deployed between an enterprise network in the IoT industry and the Internet.

2. Public Cloud

The public cloud 120 includes an attack knowledge base production system 1201 and a federated learning server 1202. The attack knowledge base production system 1201 is connected to the federated learning server 1202 through a wireless network or a wired network.

The attack knowledge base production system 1201 is configured to simulate, collect, and manage malicious samples in various attack scenarios.

The attack knowledge base production system 1201 is, for example, any one of a server, a host, or a personal computer. Optionally, the attack knowledge base production system 1201 includes an open source purchasing module, a sandbox cultivation module, and an attack simulation module. The open source purchasing module is configured to support the gateway device in purchasing an open source malicious sample. The sandbox cultivation module is configured to support the gateway device in generating a malicious sample by using a sandbox. The attack simulation module is configured to support the gateway device in generating a malicious sample by simulating a network attack.

The federated learning server 1202 is configured to: manage each participant (that is, each gateway device) of federated learning, organize each gateway device to perform model training, and deliver a model parameter and a shared malicious sample to each participant of federated learning.

The foregoing describes the system architecture provided in embodiments of this application. The following describes a hardware structure of a device in the foregoing system architecture.

Figure 2:
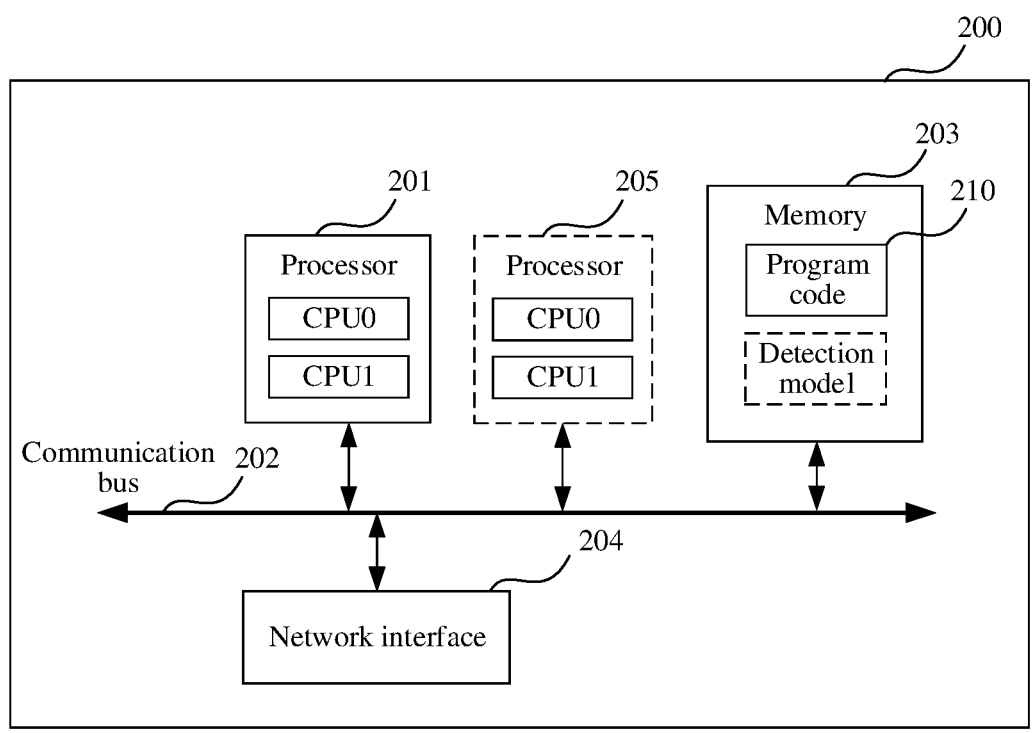
FIG. 2 is a schematic diagram of a structure of a device 200 according to an embodiment of this application.

Refer to FIG. 2. A device 200 shown in FIG. 2 is an example of hardware structures of a gateway device participating in federated learning and a public cloud in the foregoing system architecture. Optionally, the device 200 is configured as the gateway device 110, the gateway device 111, or the gateway device 112. Alternatively, optionally, the device 200 is configured as the federated learning server 1202 or the attack knowledge base production system 1201. The device 200 is, for example, a host, a server, or a personal computer.

The device 200 is optionally implemented by a general bus architecture. The device 200 includes at least one processor 201, a communication bus 202, a memory 203, and at least one network interface 204.

The processor 201 is, for example, a general-purpose central processing unit (CPU), a network processor (NP), a graphics processing unit (GPU), a neural-network processing unit (NPU), a data processing unit (DPU), a microprocessor, or one or more integrated circuits configured to implement the solutions of this application. For example, the processor 201 includes an application-specific integrated circuit (ASIC), a programmable logic device (PLD), or a combination thereof. The PLD is, for example, a complex programmable logic device (CPLD), a field-programmable gate array (FPGA), generic array logic (GAL), or any combination thereof.

The communication bus 202 is configured to transmit information between the foregoing components. The communication bus 202 may be divided into an address bus, a data bus, or a control bus. For ease of representation, only one thick line is shown in FIG. 2, but this does not mean that there is only one bus or only one type of bus.

For example, the memory 203 is a read-only memory (ROM) or another type of static storage device that can store static information and instructions, or a random access memory (RAM) or another type of dynamic storage device that can store information and instructions, or is an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can carry or store expected program code in an instruction form or a data structure form and that can be accessed by a computer. However, the memory is not limited thereto. For example, the memory 203 exists independently, and is connected to the processor 201 through the communication bus 202. The memory 203 may alternatively be integrated with the processor 201.

Optionally, the memory 203 is configured to store a detection model obtained by the device 200 performing model training. When the device 200 needs to use the detection model, the processor accesses the memory 203 to obtain the detection model stored in the memory 203.

The network interface 204 uses any apparatus such as a transceiver, and is configured to communicate with another device or a communication network. The network interface 204 includes a wired network interface, and may further include a wireless network interface. The wired network interface may be, for example, an Ethernet interface. The Ethernet interface may be an optical interface, an electrical interface, or a combination thereof. The wireless network interface may be a wireless local area network (WLAN) interface, a cellular network interface, or a combination thereof.

In a specific implementation, in an embodiment, the processor 201 may include one or more CPUs, for example, a CPU0 and a CPU1 shown in FIG. 2.

In a specific implementation, in an embodiment, the device 200 may include a plurality of processors, for example, the processor 201 and a processor 205 shown in FIG. 2. Each of the processors may be a single-core processor (single-CPU) or may be a multi-core processor (multi-CPU). The processor herein may be one or more devices, circuits, and/or processing cores configured to process data (such as computer program instructions).

In a specific implementation, in an embodiment, the device 200 may further include an output device and an input device. The output device communicates with the processor 201, and may display information in a plurality of manners. For example, the output device may be a liquid crystal display (LCD), a light emitting diode (LED) display device, a cathode ray tube (CRT) display device, or a projector. The input device communicates with the processor 201, and may receive an input from a user in a plurality of manners. For example, the input device may be a mouse, a keyboard, a touchscreen device, or a sensing device.

In some embodiments, the memory 203 is configured to store program code 210 for executing the solutions of this application, and the processor 201 may execute the program code 210 stored in the memory 203. In other words, the device 200 may implement, by using the processor 201 and the program code 210 in the memory 203, the training method for a detection model provided in the method embodiments.

The device 200 in this embodiment of this application may correspond to the first gateway device, the first server, or the second server in the method embodiments. In addition, the processor 201, the network interface 204, and the like in the device 200 may implement functions of and/or various steps and methods implemented by the first gateway device, the first server, or the second server in the method embodiments. For brevity, details are not described herein.

The foregoing describes a system architecture and a hardware structure of a device in the system architecture. The following describes a detection model provided in this embodiment. The detection model described below is, for example, obtained through training by the foregoing system architecture and the device in the foregoing system architecture.

The detection model is configured to detect whether a traffic flow is malicious. In some embodiments of this application, the detection model is used in a scenario in which a gateway device detects a traffic flow transmitted by the gateway device. The detection model is, for example, an AI model obtained through training according to a machine learning algorithm. In some embodiments, the detection model is an AI model obtained through training according to a supervised learning algorithm. For example, the detection model is a convolutional neural network (CNN) model or a random forest model. In some other embodiments, the detection model is an AI model obtained through training according to an unsupervised learning algorithm. For example, the detection model is an auto encoder (AE) or an isolated forest model.

An input parameter of the detection model includes metadata of the traffic flow. The metadata of the traffic flow includes at least one of a source IP address, a destination IP address, a source port number, a destination port number, an HTTP uniform resource locator (URL), a user agent (UA) character string, an occurrence time, or a duration of the traffic flow. For example, the detection model is a CNN model, and an input parameter of the CNN model includes HTTP metadata in the traffic flow. The HTTP metadata is, for example, an HTTP URL and a user agent character string of the traffic flow.

An output result of the detection model is for indicating whether the traffic flow is malicious. In some embodiments, the output result of the detection model includes a type of the traffic flow. The type of the traffic flow includes a malicious traffic flow or a normal traffic flow. For example, after the metadata of the traffic flow is input into the detection model, if the detection model outputs 1, it indicates that the traffic flow is a malicious traffic flow. After the metadata of the traffic flow is input into the detection model, if the detection model outputs 0, it indicates that the traffic flow is a normal traffic flow. In some other embodiments, the output result of the detection model includes a risk value or a probability value that the traffic flow is a malicious traffic flow.

The risk value is for indicating a correlation between a traffic flow and maliciousness. For example, a higher risk value indicates a higher malicious risk of a traffic flow, or a lower risk value indicates a higher malicious risk of a traffic flow.

The probability value indicates a possibility that the traffic flow is a malicious traffic flow. A larger probability value indicates a higher possibility that the traffic flow is a malicious traffic flow.

In addition, the detection model also has a hyperparameter. The hyperparameter of the detection model includes a learning rate of the detection model and an initial parameter of the detection model.

The learning rate of the detection model is for controlling a difference between model parameters of the detection model between two adjacent iterations. A smaller learning rate indicates a slower change speed of a loss function, and a larger difference between model parameters of the detection model between two adjacent iterations. For example, the learning rate is for controlling a difference between the second model parameter and a model parameter of a detection model before model training.

The initial parameter of the detection model is, for example, a model parameter of the detection model before model training. For example, the detection model is a CNN model including a convolution kernel, and the initial parameter is an initial weight of the convolution kernel in the CNN model. During model training, the initial parameter is continuously updated with continuous iteration of training, so as to gradually approach an optimal value.

The foregoing describes the detection model provided in this embodiment. The following describes a method related to the detection model from a model training side and a model application side.

Figure 3:
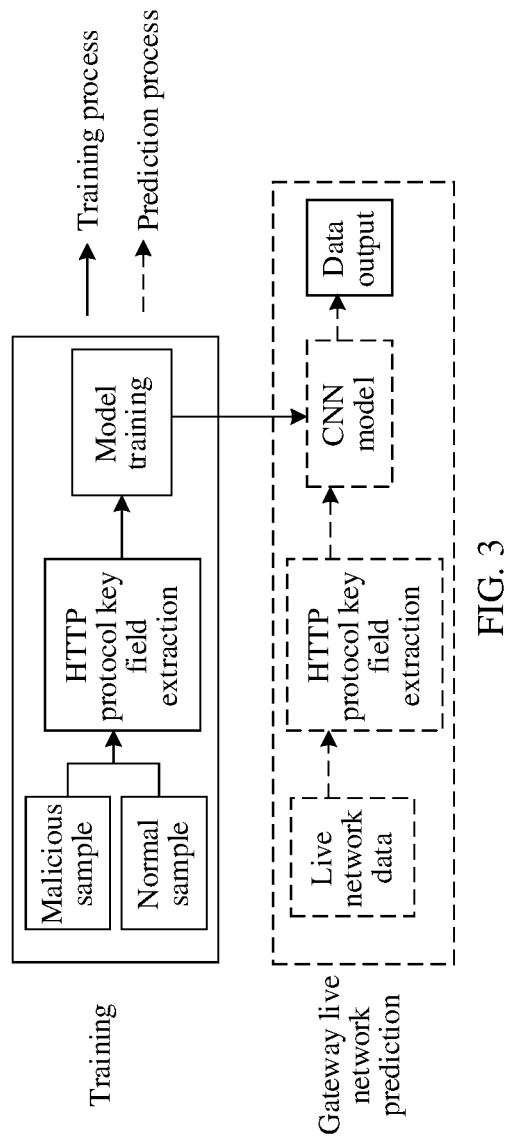
FIG. 3 is a schematic diagram of a CNN model in a model training phase and a model application phase according to an embodiment of this application.

A training method for a detection model and a method for detecting a traffic flow by using a detection model that are described below are inventions based on the same concept, or are understood as two parts in a system, or are understood as two phases of an entire process, for example, a model training phase and a model application phase. Specifically, according to the training method for a detection model provided in this embodiment of this application, symbolized and formalized intelligent information modeling, extraction, preprocessing, training, and the like are performed on training data (for example, a malicious sample and a normal sample in this application), to finally obtain a trained detection model. According to the method for detecting a traffic flow by using a detection model provided in this embodiment of this application, the trained detection model is used, and input data (for example, metadata of a traffic flow in this application) is input into the trained detection model, to obtain output data (such as a type of the traffic flow or a probability that the traffic flow is a malicious traffic flow). For example, FIG. 3 is an example of main procedures related to the CNN model in the model training phase and the model application phase. The CNN model is an example of the detection model. The CNN model is configured to detect a C&C traffic flow. In the model training phase of the CNN model, key fields of an HTTP protocol are extracted from the malicious sample, and extracted data is used for model training to obtain the CNN model. In the model application phase of the CNN model, key fields of the HTTP protocol are extracted from live network data, and extracted data is input to the trained CNN model to obtain output data.

In some embodiments of this application, the method on the model training side is implemented by using a federated learning (FL) technology. For ease of understanding, the following first describes the concept of the federated learning technology.

Federated learning is a new artificial intelligence technology in recent years. Federated learning is mainly for resolving the data island problem faced by AI algorithms during industrial implementation. The data island problem means that when AI algorithms are used in the industry, problems such as insufficient high-quality samples, inability to share samples from data sources, and data privacy protection are often faced. As a result, AI algorithms cannot efficiently and accurately use their own samples. In view of this, the industry proposes the federated learning technology to resolve the data island problem. Federated learning is a distributed training method. Participants of federated learning train their own models based on data (such as model parameters) from other parties. The participants of federated learning do not need to share data resources in a training process. Therefore, joint modeling and benefit sharing of the participants of federated learning are implemented when samples are stored locally.

In this embodiment of this application, federated learning is used in the field of network security technologies, and a detection model is trained through federated learning, so that model training can be performed together with data of each gateway device when a sample is not sent out of the local gateway device, thereby improving a model training effect while ensuring data privacy of the gateway device.

Figure 4:
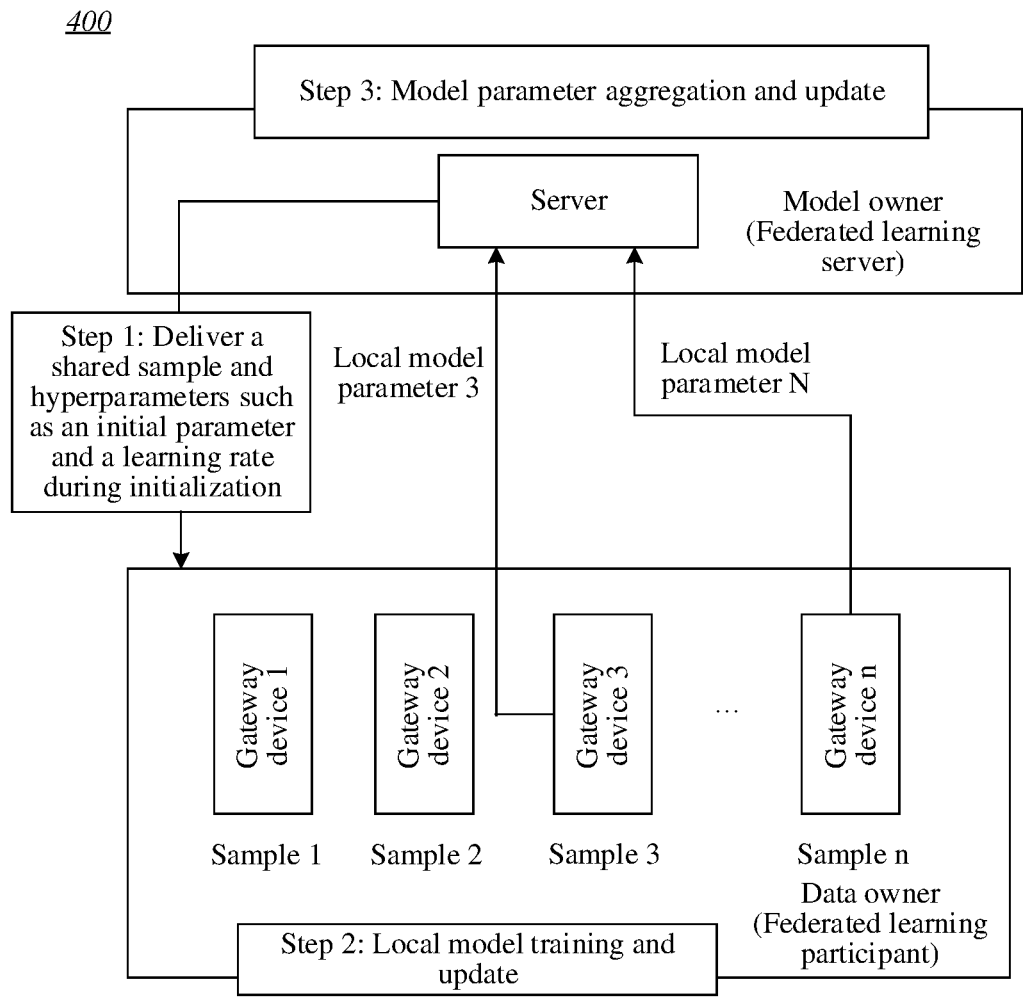
FIG. 4 is a schematic diagram of a system architecture of training a detection model based on federated learning according to an embodiment of this application.

For example, a system 400 shown in FIG. 4 is an example of a system architecture of training a detection model based on federated learning. The system 400 is, for example, implemented by using the system 100. The system 400 includes a server and n gateway devices, where n is a positive integer.

The server in the system 400 is, for example, the federated learning server 1202 in the system 100.

The n gateway devices in the system 400 are respectively a gateway device 1, a gateway device 2, a gateway device 3, . . . , a gateway device n shown in FIG. 4, and " . . . " represents another gateway device that is not shown in FIG. 4 and may be further included in the system. The gateway device 1, the gateway device 2, the gateway device 3, . . . , and the gateway device n are, for example, the gateway device 111, the gateway device 112, the gateway device 113, and the gateway device 114 shown in FIG. 1.

The gateway device and the server play different roles in a model training process.

The gateway device serves as a participant of federated learning. The gateway device is mainly responsible for calibrating malicious samples and performing model training based on local malicious samples. Sample calibration is usually a process of adding labels to samples. The label indicates a type of the sample. In this embodiment, the samples are classified into malicious samples and normal samples. Malicious sample calibration is, for example, determining metadata of a traffic flow as a malicious sample. The malicious sample calibration includes checking whether a traffic flow is a malicious traffic flow or a normal traffic flow. A sample that the gateway device is responsible for calibrating is, for example, a traffic flow transmitted by the gateway device. For example, the gateway device 1 collects a sample 1 from a traffic flow transmitted by the gateway device 1. The gateway device 1 locally stores the sample 1 in the gateway device 1. In a federated learning process, the gateway device 1 uses the sample 1 to participate in model training. Similarly, the gateway device 2 collects a sample 2 from a traffic flow transmitted by the gateway device 2. The gateway device 2 locally stores the sample 2 in the gateway device 2. In a federated learning process, the gateway device 2 uses the sample 2 to participate in model training. By analogy, the n gateway devices separately obtain a local sample according to a traffic flow transmitted by the n gateway devices, and the n gateway devices separately use the local sample to participate in model training.

The server serves as a scheduler of federated learning. The server is mainly responsible for aggregating model parameters on each gateway device, delivering various data to each gateway device, and selecting gateway devices to participate in federated learning.

The server and each gateway device transmit various data during model training. Data transmitted in different phases of model training is different. Specifically, model training includes an initialization phase and n iteration phases. In a chronological sequence, model training is performed in the following sequence: initialization phase→first iteration→second iteration→ . . . $t^{th}$ iteration→ . . . $n^{th}$ iteration. A principle of each iteration in the n iteration phases is similar; and t represents an index of a current iteration, and t is a positive integer greater than or equal to 1 and less than or equal to n.

The following specifically describes data exchanged between the gateway device and the server in the initialization phase and the n iteration phases.

In the initialization phase, the server selects gateway devices to participate in federated learning. After the server selects the gateway devices participating in federated learning, the server delivers the hyperparameter (such as the learning rate and the initial weight) of the detection model and a shared sample to each selected gateway device, so that the hyperparameter of the detection model and the shared sample are synchronized to each gateway device participating in federated learning.

During the first iteration, each gateway device participating in federated learning performs model training based on the hyperparameter and the shared sample that are delivered by the server, local malicious samples, and local normal samples, to obtain a model parameter of the first iteration. Each gateway device uploads the model parameter of the first iteration obtained by each gateway device to the server. After receiving the model parameter uploaded by each gateway device, the server aggregates the model parameter of the first iteration of each gateway device, and delivers the aggregated model parameter to each gateway device, so that the aggregated model parameter is synchronized to each gateway device. The shared sample is, for example, generated by the server by using a sandbox before the initialization phase.

During the second iteration, each gateway device participating in federated learning performs model training based on the aggregated model parameter and the shared sample that are delivered by the server, the local malicious samples, and the local normal samples, to obtain a model parameter of the second iteration. Each gateway device uploads the model parameter of the second iteration obtained by each gateway device to the server. After receiving the model parameter uploaded by each gateway device, the server aggregates the model parameter of the second iteration of each gateway device, and delivers the aggregated model parameter to each gateway device, so that the aggregated model parameter is synchronized to each gateway device.

After the n iteration processes are performed, when the server determines that the loss function converges or the accuracy of the detection model reaches an accuracy threshold, the server stops the model training process. In this case, the model training process ends, and a model parameter obtained by each gateway device in this iteration is a parameter obtained after the detection model training.

In this embodiment, the foregoing model training method is provided. During each iteration, each gateway device uploads a model parameter to the server, the server aggregates the model parameter of each gateway device, and delivers the aggregated model parameter to each gateway device. Each gateway device performs model training by using the aggregated model parameter during next iteration, so that data used by each gateway device during model training is better, thereby improving a model training effect. The following describes in detail a technical principle of improving a technical effect of model training.

From the perspective of data, if a local learning method is used for model training, only data on one gateway device can be used for model training. Due to insufficient data used for model training, a model effect is seriously affected. However, according to the foregoing model training method, because the model parameter uploaded by each gateway device is obtained by training by using samples of each gateway device, the model parameter uploaded by each gateway device can reflect information (for example, a feature of a traffic flow transmitted by each gateway device) included in the samples on each gateway device. Therefore, after the model parameters uploaded by the gateway devices are aggregated, the aggregated model parameter can comprehensively reflect information included in the samples on the gateway devices, and is richer than model parameter information learned locally by a single gateway device. Therefore, each gateway device performs model training by using the aggregated model parameter, which is equivalent to that each gateway device trains its own detection model by using data on other gateway devices. For example, when the gateway device 1 performs model training by using the aggregated model parameter, an effect achieved is similar to that the gateway device 1 trains the detection model by using data of other gateway devices participating in federated learning, such as the gateway device 2, the gateway device 3, . . . , and the gateway device n. Because more data is used for model training, the model effect can be improved.

It should be noted that this embodiment does not limit whether the data exchanged between the gateway device and the server passes through only the gateway device and the server, or passes through other devices other than the gateway device and the server. In some embodiments, one or more network devices (such as a switch and a router) are further deployed between the gateway device and the server, and the data exchanged between the gateway device and the server is forwarded by using the one or more network devices. In other words, a path through which the data exchanged between the gateway device and the server passes may be the server→the gateway device, or may be the server→the one or more network devices→the gateway device. This embodiment does not limit how to transmit data when the gateway device exchanges data with the server.

The foregoing describes an overall concept of training a detection model based on federated learning. The following describes a specific method for training a detection model based on federated learning by using an example.

The following describes, by using a method 500 and a method 600, methods for training a detection model based on federated learning from a perspective of a gateway device and a perspective of a server. The method 500 is an example of a method performed by a gateway device participating in federated learning. The method 600 is an example of a method performed by a server participating in federated learning.

A first gateway device and a second gateway device in the method 500 and the method 600 each are a gateway device participating in federated learning. For example, the first gateway device is the gateway device 110 in the system architecture 100 shown in FIG. 1, and the second gateway device is the gateway device 11 in the system architecture 100 shown in FIG. 1. For example, the first gateway device is one of the gateway device 1, the gateway device 2, the gateway device 3, . . . , and the gateway device n in the system architecture 400 shown in FIG. 4, and the second gateway device is another gateway device other than the first gateway device in the gateway device 1, the gateway device 2, the gateway device 3, . . . , and the gateway device n in the system architecture 400 shown in FIG. 4.

A first server in the method 500 and the method 600 is a server participating in federated learning. For example, the first server is the federated learning server 1202 in the system architecture 100 shown in FIG. 1. For example, the first server is the server in the system architecture 400 shown in FIG. 4.

Optionally, the method 500 and the method 600 are processed by a general-purpose CPU. Alternatively, the method 500 and the method 600 are processed jointly by a CPU and one or more AI accelerator cards. For example, the CPU and the AI accelerator card are configured to undertake processing work corresponding to different steps in the method 500 and the method 600. For example, the AI accelerator card undertakes processing work corresponding to model training in the method 500 and the method 600. The CPU undertakes processing work corresponding to malicious sample obtaining in the method 500 and the method 600. The AI accelerator card is, for example, a GPU, an embedded neural-network processing unit (NPU), a tensor processing unit (TPU), or another chip customized for machine learning.

Figure 7:
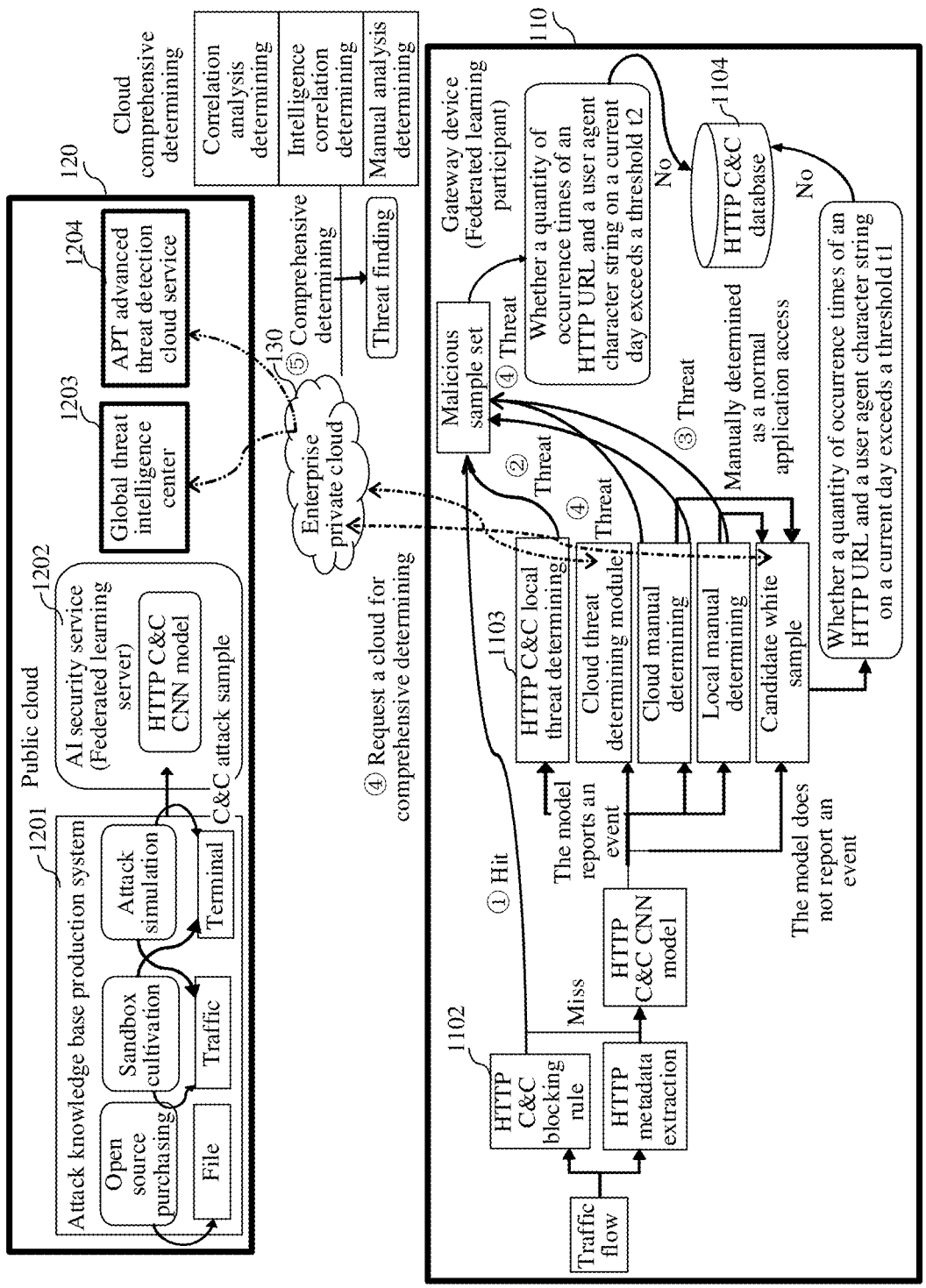
FIG. 7 is a schematic diagram of a system architecture according to an embodiment of this application.

A second server in the method 500 is, for example, an enterprise private cloud 130 in a system architecture shown in FIG. 7. The second server and the first gateway device in the method 500 are, for example, located in a same enterprise network.

Malicious samples and normal samples in the method 500 and the method 600 are, for example, data locally maintained by the gateway device. For example, the malicious samples and the normal samples in the method 500 are data stored in a database 1104 shown in FIG. 7.

Shared samples in the methods 500 and 600 are, for example, data generated by the server. For example, the shared samples in the method 500 and the method 600 are data generated by the attack knowledge base production system 1201 shown in FIG. 1 or FIG. 7.

In the method 500 and the method 600, an example in which a detection model is a CNN model for detecting a C&C traffic flow is used for description. It should be noted that a specific type of the detection model is not limited in this embodiment. A method performed when the detection model is another type of AI model is similar to the method 500 and the method 600.

In the method 500 and the method 600, an example in which a malicious traffic flow is a C&C traffic flow and a malicious sample is metadata of the C&C traffic flow is used for description. It should be noted that specific types of the malicious traffic flow and the malicious sample are not limited in this embodiment. In other words, a type of network attack triggered by a traffic flow whose metadata is used by the gateway for model training is not limited, and a type of malicious traffic flow detected by using the detection model is also not limited.

Optionally, the first gateway device, the second gateway device, the first server, and the second server in the method 500 and the method 600 are implemented by using the device 200 shown in FIG. 2. Various steps implemented by the first gateway device, the second gateway device, the first server, or the second server in the method 500 and the method 600 are implemented by hardware in the device 200. For example, the steps of the method 500 and the method 600 are completed by using an integrated logic circuit of hardware in the processor 201 of the device 200 or instructions in a form of software. The steps of the method disclosed with reference to embodiments of this application may be directly performed by a hardware processor, or may be performed by using a combination of hardware and a software module in the processor. The software module is located in a mature storage medium in the art, for example, a random access memory, a flash memory, a read-only memory, a programmable read-only memory, an electrically erasable programmable memory, or a register. For example, the storage medium is located in the memory 210. The processor 201 reads information in the memory 210, and completes the steps of the method 500 and the method 600 in combination with hardware of the processor.

Figure 5:
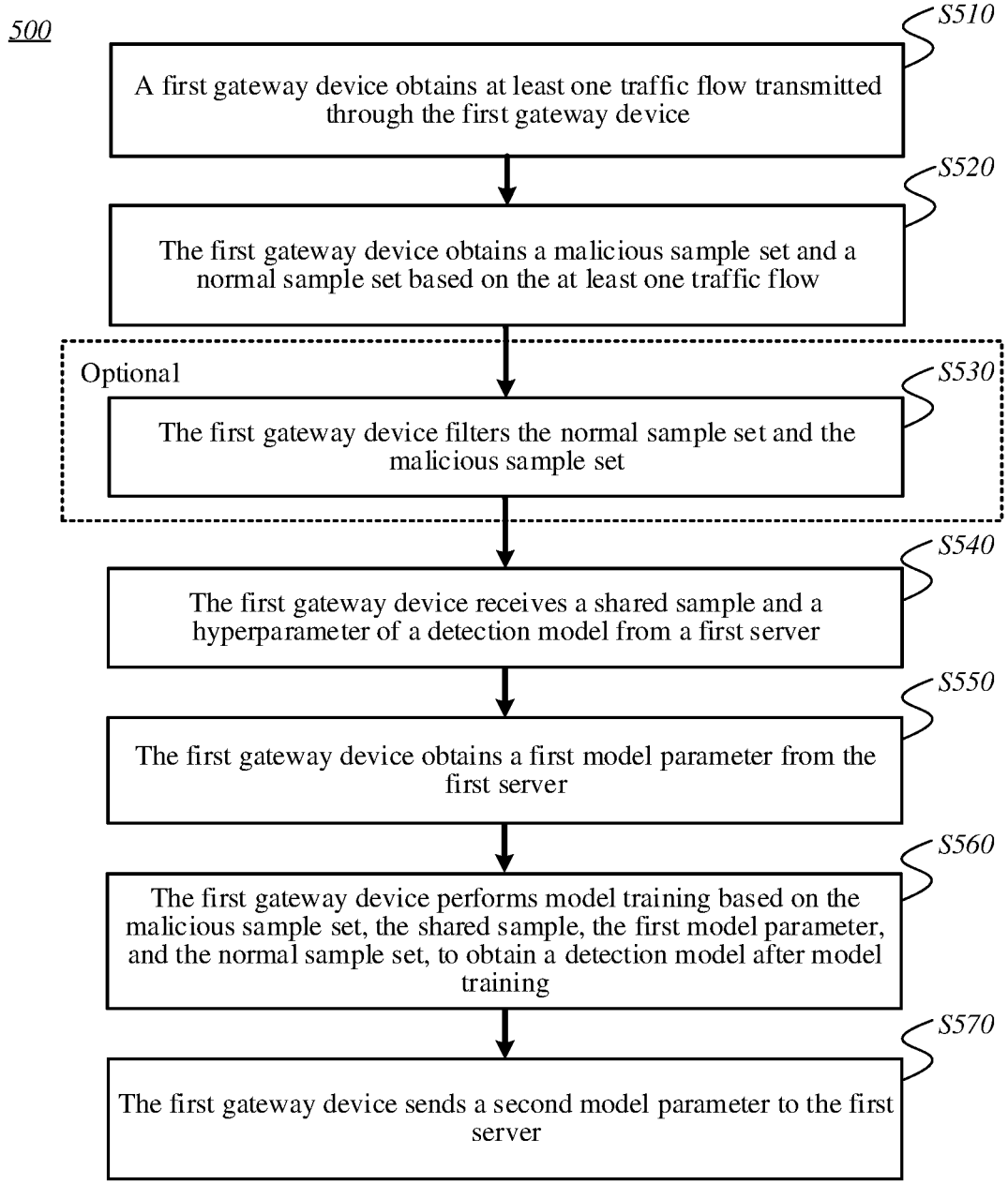
FIG. 5 is a flowchart of a training method for a detection model according to an embodiment of this application.

FIG. 5 is a flowchart of a method 500. The method 500 includes S510 to S570.

S510: A first gateway device obtains at least one traffic flow transmitted through the first gateway device.

The first gateway device obtains the traffic flow in a plurality of manners. For example, the first gateway device is deployed at an egress of an intranet, and the first gateway device receives traffic flows transmitted between different hosts in the intranet; or the first gateway device receives traffic flows transmitted between the intranet and an external network. For example, when a host in the intranet initiates access to an external network device, the host in the intranet generates and sends a traffic flow; the traffic flow is transmitted to the first gateway device through a network; and the first gateway device receives the traffic flow. For another example, when an external network device transmits data to a host in the intranet, the external network device generates and sends a traffic flow; the traffic flow is transmitted to the first gateway device through a network; and the first gateway device receives the traffic flow.

After obtaining the traffic flow, the first gateway device calibrates an attack sample and a normal sample based on the obtained traffic flow. The following describes, by using step S520 as an example, how to calibrate an attack sample and a normal sample.

S520: The first gateway device obtains a malicious sample set and a normal sample set based on the at least one traffic flow.

A sample is data for training a detection model. In this embodiment, the sample is metadata of a traffic flow.

For example, one sample is metadata of one traffic flow. The metadata of the traffic flow is data for describing the traffic flow. For example, samples are classified into malicious samples and normal samples.

A malicious sample is metadata of a malicious traffic flow. For example, one malicious sample is metadata of one malicious traffic flow. The malicious sample is also referred to as a black sample or an attack sample. The malicious sample set includes at least one malicious sample.

A normal sample is metadata of a normal traffic flow. For example, one normal sample is metadata of one normal traffic flow. The normal sample is also referred to as a white sample. The normal sample set includes at least one normal sample.

There are a plurality of manners for the first gateway device to obtain the malicious sample set and the normal sample set. For example, the first gateway device identifies at least one malicious traffic flow and at least one normal traffic flow in the at least one traffic flow; the first gateway device obtains metadata of each malicious traffic flow in the at least one malicious traffic flow; the first gateway device uses the metadata of each malicious traffic flow as a malicious sample, to obtain a malicious sample set; the first gateway device obtains metadata of each normal traffic flow in the at least one normal traffic flow; and the first gateway device uses the metadata of each normal traffic flow as a normal sample, to obtain a normal sample set.

Optionally, after performing S520, the first gateway device further performs the following S530. Alternatively, optionally, after performing S520, the first gateway device does not perform S530, and performs S540.

S530: The first gateway device filters the normal sample set and the malicious sample set.

After obtaining the normal sample set and the malicious sample set, the first gateway device separately filters the normal sample set and the malicious sample set, so as to perform model training by using a filtered sample. By performing the step of sample filtering, a problem of unbalanced quantities of local malicious samples and local normal samples of the gateway device can be resolved, which helps balance local malicious samples and local normal samples of the first gateway device as much as possible. Therefore, poor performance of a model caused by difficulty in learning knowledge included in a smaller quantity of samples is avoided, and performance of a detection model obtained through training is improved.

The balance between malicious samples and normal samples means that a magnitude difference between the malicious samples and the normal samples is not large. For example, a ratio of a quantity of malicious samples to a quantity of normal samples is not less than a ratio threshold, and the ratio threshold is, for example, 1:100. In other words, it is assumed that the quantity of malicious samples is A, and the quantity of normal samples is B. When a value of A/B ranges from 0.1 to 10, it is referred to as basic balance between the malicious samples and the normal samples.

There are a plurality of manners for the first gateway device to filter the normal sample set and the malicious sample set. In some embodiments, sample filtering is determined based on a quantity relationship between a quantity of occurrence times of a sample in a historical time period and a threshold. The first gateway device removes a sample whose quantity of occurrence times in the historical time period exceeds the threshold, and reserves a sample whose quantity of occurrence times in the historical time period does not exceed the threshold, so as to implement sample filtering. A unit of the historical time period includes but is not limited to a day, a week, or an hour. For example, the historical time period is one or more days.

In some embodiments, there is a specific quantity relationship between a threshold for filtering a normal sample set and a threshold for filtering a malicious sample set. The threshold for filtering a normal sample set is greater than the threshold for filtering a malicious sample set. Considering that a case in which a quantity of malicious samples is small and a quantity of normal samples is large often occurs on the live network, by using this technical means, because the threshold for filtering a normal sample set is large, and the threshold for filtering a malicious sample set is small, a quantity of normal samples can be reduced, and a quantity of malicious samples can be increased, thereby meeting a requirement for sample balancing. In some embodiments, the threshold for filtering a normal sample set and the threshold for filtering a malicious sample set are further determined based on a memory capacity of the gateway device. For example, a smaller memory capacity of the gateway device indicates a lower threshold for filtering a normal sample set and a lower threshold for filtering a malicious sample set, so that a quantity of samples stored in the gateway device is reduced, and excessive samples are prevented from occupying limited memory space of the gateway device.

In some embodiments, the first gateway device separately creates tables for the malicious sample and the normal sample. After obtaining the malicious sample and the normal sample, the first gateway device separately stores the malicious sample and the normal sample in corresponding tables. The first gateway device filters the normal sample set and the malicious sample set by looking up the table. The table uses a key-value index structure. The key of the table is metadata of a traffic flow. The value of the table indicates a quantity of occurrence times of a sample in the historical time period. The first gateway device filters the normal sample set and the malicious sample set by looking up the table. For example, the table is stored in a database.

For example, when storing an HTTP C&C malicious sample, the gateway device creates a table according to a date. The key of the table is an HTTP URL and a user agent character string of a traffic flow. The value of the table is a quantity of occurrence times of the HTTP C&C malicious sample on a current day. In some embodiments, the gateway device creates a maximum of 30 tables for the HTTP C&C malicious sample. The 30 tables store data of the HTTP C&C malicious sample in the latest 30 days.

For example, the gateway device creates a table black_http_cc_2020_05_01. The table black_http_cc_2020_05_01 represents data of the HTTP C&C malicious sample on May 1. The key of the table black_http_cc_2020_05_01 is an HTTP URL and a user agent character string. The value of the table black_http_cc_2020_05_01 indicates a quantity of occurrence times of the key on May 1, 2020. A quantity of tables created by the gateway device is determined according to the memory capacity of the gateway device, the 30 tables are an example of a quantity of tables created for a malicious sample, and 7 tables are an example of a quantity of tables created for a normal sample. A specific quantity of tables created by the gateway device is not limited in this embodiment.

For example, when storing an HTTP C&C normal sample, the gateway device creates a table according to a date. The key of the table is an HTTP URL and a user agent character string of a traffic flow. The value of the table is a quantity of occurrence times of the HTTP C&C normal sample on a current day. In some embodiments, the gateway device creates a maximum of 7 tables for the HTTP C&C normal sample. The 7 tables store data of the HTTP C&C normal sample in the latest 7 days.

For example, the gateway device creates a table white_http_cc_2020_05_01. The table white_http_cc_2020_05_01 represents data of the HTTP C&C normal sample on May 1. The table white_http_cc_2020_05_01 is shown in the following Table 1.

TABLE 1

| key | value |
| --- | --- |
| "http://thediscriminationlaws.com/Java/1.7.0_161" | 100 |
| http://tjv1.ejie.me/statistics/timestamp Mozilla/5.0 (Windows NT 10.0; Win64; x64; rv:65.0) Gecko/20100101 Firefox/65.0 | 200 |

In the first entry in Table 1, "http://thediscriminationlaws.com/" represents an HTTP URL, "Java/1.7.0_161" represents a user agent character string, and 100 represents that there are 100 HTTP URLs and user agent character strings in total on May 1, 2020 when Table 1 is queried. In the second entry in Table 1, "http://tjv1.ejie.me/statistics/timestamp" represents an HTTP URL, "Mozilla/5.0 (Windows NT 10.0; Win64; x64; rv:65.0) Gecko/20100101 Firefox/65.0" represents a user agent character string, and 200 represents that there are 200 HTTP URLs and user agent character strings in total on May 1, 2020 when Table 1 is queried.

In some embodiments, the first gateway device obtains a quantity of occurrence times of a first normal sample in a fourth time period, and the first gateway device determines whether the quantity of occurrence times of the first normal sample in the fourth time period exceeds a first threshold. If the quantity of occurrence times of the first normal sample in the fourth time period exceeds the first threshold, the first gateway device removes the first normal sample from the normal sample set. The first normal sample is a normal sample in the normal sample set. The fourth time period is a historical time period to which a moment at which the first gateway device obtains the first normal sample belongs.

For example, a time at which the gateway device processes the normal sample is May 1, 2020. The gateway device combines an http_url and a user agent of the normal sample into http_url_user agent_white_sample. The gateway device queries the white_http_cc_2020_05_01 table for a quantity white_count corresponding to http_url_user agent_white_sample. If the quantity white_count exceeds a threshold t1, the gateway device discards the normal sample. If the quantity white_count does not exceed the threshold t1, the gateway device updates the quantity white_count corresponding to http_url_user agent_white_sample in the white_http_cc_2020_05_01 table to white_count+1.

May 1, 2020 is an example of the fourth time period when the historical time period is one day. The threshold t1 is an example of the first threshold. The threshold t1 is, for example, set according to experience, and the threshold t1 is, for example, 10000. The quantity white_count is an example of the quantity of occurrence times of the first normal sample in the fourth time period, and http_url_user agent_white_sample is an example of the first normal sample.

In some embodiments, the first gateway device obtains a quantity of occurrence times of a first malicious sample in a fifth time period, and the first gateway device determines whether the quantity of occurrence times of the first malicious sample in the fifth time period exceeds a second threshold. If the quantity of occurrence times of the first malicious sample in the fifth time period exceeds the second threshold, the first gateway device removes the first malicious sample from the malicious sample set. The second threshold is less than the first threshold, and the fifth time period is a historical time period to which a moment at which the first gateway device obtains the first malicious sample belongs.

For example, a time at which the gateway device processes the malicious sample is May 1, 2020. The gateway device combines an http_url and a user agent of the malicious sample into http_url_user agent_black_sample. The gateway device queries the black_http_cc_2020_05_01 table for a quantity black_count corresponding to http_url_user agent_black_sample. If the quantity black_count exceeds a threshold t2, the gateway device discards the malicious sample. If the quantity black_count does not exceed the threshold t2, the gateway device updates the quantity black_count corresponding to http_url_user agent_black_sample in the black_http_cc_2020_05_01 table to black_count+1.

May 1, 2020 is an example of the fifth time period when the historical time period is one day. The threshold t2 is an example of the second threshold. The threshold t2 is, for example, set according to experience, and the threshold t2 is, for example, 1000. The quantity black_count is an example of the quantity of occurrence times of the first malicious sample in the fifth time period, and http_url_user agent_black_sample is an example of the first malicious sample.

The following describes, by using step S540 as an example, steps performed by the gateway device in the initialization phase. Step S550 to step S570 are used as an example to describe steps performed by the gateway device in one iteration in the n iterations. In other words, step S540 describes how the gateway device obtains a malicious sample and a hyperparameter from a cloud in the initialization phase, and step S550 to step S570 describe how the gateway device optimizes a model parameter in one iteration.

S540: The first gateway device receives a shared sample and a hyperparameter of a detection model from a first server.

The shared sample is a malicious sample provided by the first server for each gateway device in a gateway device set. The shared sample is, for example, metadata of a C&C flow. For example, as shown in FIG. 1 or FIG. 7, the shared sample is generated by the cloud attack knowledge base production system 1201 of the public cloud 120. The shared sample is delivered by the federated learning server 1202 of the public cloud 120 to each gateway device in the gateway device set.

The gateway device set includes the first gateway device and another gateway device participating in federated learning. In some embodiments, the first server provides a same shared sample for all gateway devices in the gateway device set. For example, the gateway device set includes a gateway device 1, a gateway device 2, . . . , a gateway device i . . . , and a gateway device n, and a shared sample provided by the first server for the gateway device 1, a shared sample provided for the gateway device 2, and a shared sample provided for the gateway device n are the same. Therefore, when the gateway device 1, the gateway device 2, . . . , the gateway device i . . . , and the gateway device n participate in model training, shared samples used by the gateway device 1, the gateway device 2, . . . , the gateway device i . . . , and the gateway device n are the same. Because the shared sample is shared by all gateway devices during model training, a function of sharing a same type of malicious sample by all gateway devices to participate in model training is implemented.

The cloud delivers the shared malicious sample to the gateway device, and the gateway device participates in model training by using the malicious sample delivered by the cloud. This helps resolve a problem of unbalanced malicious samples between gateway devices participating in federated learning. For example, malicious samples in different enterprises are generally severely unbalanced. As a result, after a gateway device of an enterprise is selected as a participant of federated learning, an effect of a final model is severely affected. However, the cloud delivers the malicious sample to the gateway device of each enterprise, so that the gateway device of each enterprise obtains the malicious sample from the cloud. Therefore, the malicious samples of the gateway device of each enterprise are more balanced. In this case, because different gateway devices perform model training based on more balanced malicious samples, this definitely helps improve an effect of a model obtained through training. In addition, this helps alleviate a problem of insufficient malicious samples in the sample set, and can provide richer malicious samples for training of the detection model. Further, because richer malicious samples are used to drive model training, the accuracy of the detection model is improved.

The hyperparameter includes a learning rate of the detection model and an initial parameter of the detection model. In some embodiments, the first server provides a same hyperparameter for each gateway device in the gateway device set, so that each gateway device trains its own detection model based on the same hyperparameter.

In some embodiments, the initial parameter of the detection model is the same as an initial parameter of the initial detection model. The initial parameter of the detection model is for generating the initial detection model.

The foregoing describes, by using step S540, the steps performed in the initialization phase of model training. In some embodiments, the cloud delivers a shared sample once in the initialization phase, and each gateway device locally stores the shared sample sent by the cloud. During each iteration, the cloud does not need to deliver a shared sample again, and each gateway device uses the pre-stored shared sample to participate in model training.

S550: The first gateway device obtains a first model parameter from the first server.

For example, in the $t^{th}$ iteration of the n iterations, the cloud sends a model parameter $w_G^t$ of the detection model in a current iteration to each gateway device participating in federated learning. Each gateway device participating in federated learning receives the model parameter $w_G^t$ of the detection model in the current iteration. $w_G^t$ is an example of the first model parameter, and $w_G^t$ indicates the model parameter in the $t^{th}$ iteration. G represents, for example, a weight, and $w_G^t$ is a weight of a model in the $t^{th}$ iteration.

S560: The first gateway device performs model training based on the malicious sample set, the shared sample, the first model parameter, and the normal sample set, to obtain a detection model after model training.

For example, each gateway device participating in federated learning performs model training by using a local malicious sample, a local normal sample, and metadata of a C&C flow delivered by the cloud. In the $t^{th}$ iteration of the n iterations, the gateway device i updates a local model parameter $w_i^t$. In a possible implementation, the gateway device i calculates an updated model parameter $w_i^{t*}$ by using a minimization loss function. The gateway device i updates the local model parameter $w_i^t$ to the model parameter $w_i^{t*}$, where $w_i$ represents a model parameter of the gateway device i before update in the $t^{th}$ iteration, and $w_i^{t*}$ represents a model parameter of the gateway device i after update in the $t^{th}$ iteration. The gateway device i represents one gateway device in the gateway devices participating in federated learning. The gateway device i is an example of the first gateway device.

In some embodiments, the step that the gateway device i calculates the updated model parameter $w_i^{t*}$ is implemented based on the following Formula (1).

$$w_i^{t*} = \arg\min_{w_i^t} L(w_i^t); \qquad \text{Formula (1)}$$

In Formula (1), $L(w_i^t)$ represents a loss function, arg represents an argument, min represents a minimum value, and argmin represents a value of the argument $w_i^t$ when $L(w_i^t)$ reaches the minimum value.

S570: The first gateway device sends a second model parameter to the first server.

The detection model after model training includes a second model parameter. For example, in the scenario shown in FIG. 1, after the gateway device 110 participating in federated learning obtains the updated model parameter $w_i^{t*}$, the gateway device 110 sends the updated model parameter $w_i^{t*}$ to the federated learning server 1202 on the cloud. $w_i^{t*}$ is an example of the second model parameter.

In the n iterations, the foregoing described steps in which the gateway device obtains the model parameter from the server, performs model training based on the model parameter delivered by the server, the local malicious sample set and normal sample set, and the shared sample, and reports the model parameter obtained through training to the server are repeatedly performed until the loss function converges or the accuracy reaches an accuracy threshold. For example, the accuracy threshold is 99%.

Figure 6:
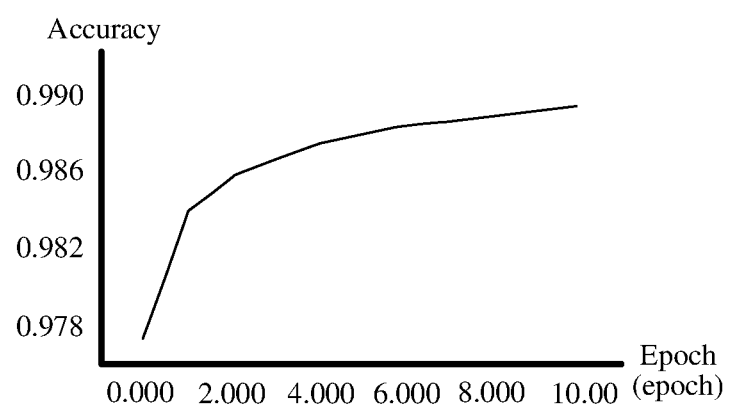
FIG. 6 is a schematic diagram of accuracy of training a detection model according to an embodiment of this application.

For example, FIG. 6 shows an example of how the accuracy changes in a training process. A horizontal coordinate in FIG. 6 represents an epoch of iteration. A vertical coordinate in FIG. 6 represents the accuracy. A curve in FIG. 6 represents a relationship between the accuracy and the epoch. Generally, the accuracy gradually increases with the increase of the epoch. In some embodiments, in a model training process, the accuracy threshold is 99%. When the accuracy of three consecutive epochs is greater than 99%, training ends.

The epoch is a process of performing model training by using all samples in a training set. In some embodiments of this application, an epoch is a process of training a detection model once by using all malicious samples in a malicious sample set and all normal samples in a normal sample set. For example, when the detection model is a convolutional neural network, an epoch is a process in which all malicious samples in a malicious sample set and all normal samples in a normal sample set are forward propagated and backward propagated once in the convolutional neural network.

In the method provided in this embodiment, the gateway device interacts with the server to receive the model parameter and the shared sample that are delivered by the server, and the gateway device performs model training by using the model parameter and the shared sample that are delivered by the server, and the locally calibrated malicious sample, thereby improving an effect of model training and further improving performance of a detection model obtained through training.

The foregoing describes an overall process of how a gateway device participates in federated learning. The following describes how a gateway device specifically calibrates a sample by using an example.

A system architecture shown in FIG. 7 described below is an example of the system architecture 100 shown in FIG. 1. FIG. 7 not only includes the two types of nodes, namely, the gateway device and the public cloud shown in FIG. 1, but also includes an optional module involved in calibrating a malicious sample.

Optionally, the gateway device includes two levels of threat detection modules. Refer to FIG. 7. The threat detection module at the first level includes a rule system and a detection model. The rule system includes various rules for detecting a traffic flow. The rule system specifically includes a blocking rule (for example, an HTTP C&C blocking rule 1102 shown in FIG. 7) and a non-blocking rule. The threat detection module at the second level includes a local threat determining module (for example, an HTTP C&C local threat determining module 1103 shown in FIG. 7), a cloud threat determining module, a cloud manual determining module, and a local manual determining module.

The local threat determining module is configured for the gateway device to perform threat detection on the traffic flow locally. For example, optionally, the local threat determining module is configured to support the gateway device in performing the step of determining, based on whether a probability value is greater than a threshold, whether a domain generation algorithm (DGA) event exists, whether an intranet brute force cracking event exists, whether a sensitive information leakage event exists, and whether an external network distributed denial of service (DDoS) event exists, whether the traffic flow is a malicious traffic flow.

Optionally, the cloud threat determining module is configured to request the enterprise private cloud 130 to perform threat detection on the traffic flow, so as to send, to a cloud for threat determining, an event that cannot be locally determined as a threat. For example, the cloud threat determining module is configured to support the gateway device in performing a step of sending context information of the traffic flow to the enterprise private cloud 130 and receiving an analysis result from the enterprise private cloud 130.

Optionally, the cloud manual determining module is configured to provide information about the traffic flow for a cloud operation and maintenance team through a network, so that the cloud operation and maintenance team manually performs threat determining on the traffic flow.

Optionally, the local manual determining module is configured to output the information about the traffic flow to a local operation and maintenance team, so that the local operation and maintenance team manually performs threat determining on the traffic flow.

Optionally, as shown in FIG. 7, the system architecture further includes the enterprise private cloud 130.

The enterprise private cloud 130 is configured to respond to a request of the cloud threat determining module, and assist the gateway device in performing threat analysis. Specifically, when it is difficult for the gateway device to locally determine a threat, the gateway device sends the context information of the traffic flow to the enterprise private cloud 130, and the enterprise private cloud 130 performs comprehensive analysis on the traffic flow. After the enterprise private cloud 130 determines through analysis whether the traffic flow is a malicious traffic flow, the enterprise private cloud 130 returns an analysis result to the gateway device.

The enterprise private cloud 130 is, for example, any one of a server, a host, or a personal computer. The enterprise private cloud 130 includes a correlation analysis determining module, an intelligence correlation analysis module, and a manual analysis determining module. A working principle of the correlation analysis determining module is similar to that of the local threat determining module. The intelligence correlation analysis module is configured to perform threat determination on the traffic flow by using threat intelligence. The manual analysis determining module is configured to provide the information about the traffic flow for an operation and maintenance team, so that the operation and maintenance team manually performs threat determining on the traffic flow.

Optionally, the enterprise private cloud 130 is connected to a global threat intelligence center 1203 and an APT advanced threat detection cloud service 1204 through a wireless network or a wired network. The global threat intelligence center 1203 is configured to provide threat intelligence. The enterprise private cloud 130 obtains, by accessing the global threat intelligence center 1203, threat intelligence provided by the global threat intelligence center 1203.

Optionally, the APT advanced threat detection cloud service 1204 is configured to detect an APT advanced threat. The enterprise private cloud 130 may request the APT advanced threat detection cloud service 1204 to further detect the traffic flow.

It should be noted that, the system 100 shown in FIG. 7 is an example of separate deployment of the enterprise private cloud 130 and the gateway device 110. In some other embodiments, the enterprise private cloud 130 and the gateway device 110 are physically integrated together, and the enterprise private cloud 130 and the gateway device 110 are disposed in a same hardware device. When the enterprise private cloud 130 is integrated with the gateway device 110, functional modules included in the enterprise private cloud 130 and functional modules included in the gateway device 110 are disposed in a same hardware device. The hardware device implements a function corresponding to the gateway device 110 and a function corresponding to the enterprise private cloud 130, for example, implements a function corresponding to the local threat determining module and a function corresponding to the intelligence correlation analysis module.

With reference to FIG. 7, the foregoing describes some optional modules and architectures related to malicious sample calibration. The following describes a procedure of a method for calibrating a malicious sample based on the architecture shown in FIG. 7 by using an example.

In some embodiments, a specific implementation that the first gateway device calibrates a malicious sample includes the following Manner one to Manner three. In other words, Manner one to Manner three describe how the first gateway device uses the architecture shown in FIG. 7 to calibrate a malicious sample, so as to use the malicious sample to participate in federated learning.

Manner one: The first gateway device obtains a malicious sample based on a blocking rule.

The blocking rule is for blocking a malicious traffic flow. In some embodiments, the blocking rule indicates a correspondence between a malicious traffic flow and a discard action. When a traffic flow hits the blocking rule, it indicates that the traffic flow is a malicious traffic flow, and the first gateway device discards the malicious traffic flow according to a discard action indicated by the blocking rule. Therefore, transmission of the malicious traffic flow is interrupted at the first gateway device, so as to block the malicious traffic flow.

In some embodiments, that a traffic flow hits the blocking rule is that metadata of the traffic flow and metadata in the blocking rule meet a matching condition. For example, the blocking rule includes two entries: an entry A and an entry B. The entry A includes metadata of a malicious traffic flow, for example, an Internet Protocol (IP) address. The entry B includes an identifier of a discard action (for example, "drop" or "deny"). The first gateway device matches the metadata of the traffic flow with the metadata in the entry A, so as to determine whether the metadata of the traffic flow and the metadata in the blocking rule meet the matching condition.

Meeting the matching condition includes a plurality of cases. For example, the meeting the matching condition means that the metadata of the traffic flow strictly matches the metadata in the blocking rule, that is, the metadata of the traffic flow is the same as the metadata in the blocking rule. For another example, the meeting the matching condition means that the metadata of the traffic flow matches the metadata in the blocking rule for a longest time.

This embodiment does not limit how the first gateway device obtains the blocking rule. In some embodiments, the blocking rule is pre-stored in a memory of the first gateway device. In some other embodiments, the blocking rule is delivered by a server (for example, a private cloud server) to the first gateway device.

Using Manner one for a first traffic flow as an example, if the first traffic flow hits the blocking rule, the first gateway device determines metadata of the first traffic flow as a malicious sample. The first traffic flow is one traffic flow in the at least one traffic flow. For example, as shown in FIG. 7, after a traffic flow enters a gateway device, if the traffic flow hits an HTTP C&C blocking rule 1102, the gateway device adds metadata corresponding to the traffic flow to the malicious sample set. The HTTP C&C blocking rule 1102 is an example of the blocking rule.

Manner one provides a technical means of calibrating a malicious sample on a gateway device. Because the gateway device obtains, by using the blocking rule, malicious samples from the traffic flow transmitted by the gateway device, the complexity of obtaining malicious samples is reduced, which helps enrich malicious samples in the malicious sample set. Further, richer malicious samples are provided for training the detection model, which helps drive model training by using the richer malicious samples, thereby improving the accuracy of the detection model.

Manner two: The first gateway device obtains a malicious sample based on the detection model before model training and local analysis.

In some embodiments, each time when performing model training, the first gateway device obtains, by using a detection model before the current model training, a malicious sample required for the current model training.

For example, federated learning includes four model training in total. The first gateway device performs model training for the first time based on a detection model 0, so that the detection model 0 is updated to a detection model 1; the first gateway device performs model training for the second time based on the detection model 1, so that the detection model 1 is updated to a detection model 2; the first gateway device performs model training for the third time based on the detection model 2, so that the detection model 2 is updated to a detection model 3; and the first gateway device performs model training for the fourth time based on the detection model 3, so that the detection model 3 is updated to a detection model 4.

In this scenario, for example, the first gateway device calibrates a malicious sample 0 by using the detection model 0, and then performs model training for the first time based on the malicious sample 0; the first gateway device calibrates a malicious sample 1 by using the detection model 1, and then performs model training for the second time based on the malicious sample 1; the first gateway device calibrates a malicious sample 2 by using the detection model 2, and then performs model training for the third time based on the malicious sample 2; and the first gateway device calibrates a malicious sample 3 by using the detection model 3, and then performs model training for the fourth time based on the malicious sample 3.

The detection model 0 is an example of the initial detection model, and the malicious sample 0 is determined, for example, based on an output result of the detection model 0. The detection model 1 is an example of a detection model before model training is performed for the second time, and the malicious sample 1 is determined, for example, based on an output result of the detection model 1. The detection model 2 is an example of a detection model before model training is performed for the third time, and the malicious sample 2 is determined, for example, based on an output result of the detection model 2. The detection model 3 is an example of a detection model before model training is performed for the fourth time, and the malicious sample 3 is determined, for example, based on an output result of the detection model 3.

The initial detection model is a detection model before model training when the first gateway device performs model training for the first time. For a model training process, refer to the descriptions of steps such as S560. The initial detection model and a detection model obtained in the following steps have a same network architecture. For example, the network architecture includes layers of the model and connection relationships between different layers. A model parameter of the initial detection model may be different from a model parameter of the detection model obtained in the following steps. For example, weights of convolution kernels may be different.

In some embodiments, an output result of the initial detection model indicates a probability value. The probability value indicates a possibility that a second traffic flow is a malicious traffic flow. A larger probability value indicates a higher possibility that the second traffic flow is a malicious traffic flow. Whether the second traffic flow is a malicious traffic flow or a suspicious traffic flow can be indicated based on a quantity relationship between the probability value and a threshold. For example, if the probability value is less than a threshold A, it indicates that the second traffic flow is a normal traffic flow; if the probability value is greater than or equal to the threshold A and less than a threshold B, it indicates that the second traffic flow is a suspicious traffic flow; and if the probability value is greater than the threshold B, it indicates that the second traffic flow is a malicious traffic flow. The threshold B is greater than the threshold A. For example, the threshold B is 0.85, and the threshold A is 0.5.

The local analysis is a technical means of analyzing a traffic flow by the first gateway device. In some embodiments, when finding a suspicious traffic flow by using the detection model before model training, the first gateway device continues to perform local analysis on the suspicious traffic flow, to determine whether metadata of the suspicious traffic flow is a malicious sample.

Using Manner two for the second traffic flow as an example, for example, if the second traffic flow does not hit the blocking rule, the first gateway device inputs metadata of the second traffic flow into the detection model before model training; if an output result of the detection model before model training indicates that the second traffic flow is a suspicious traffic flow, the first gateway device analyzes the second traffic flow; and if it is determined through analysis that the second traffic flow is a malicious traffic flow, the first gateway device determines the metadata of the second traffic flow as a malicious sample.

That a traffic flow does not hit the blocking rule is that, for example, metadata of the traffic flow and the metadata in the blocking rule do not meet the matching condition. For descriptions of the blocking rule and the matching condition, refer to Manner one.

Figure 8:
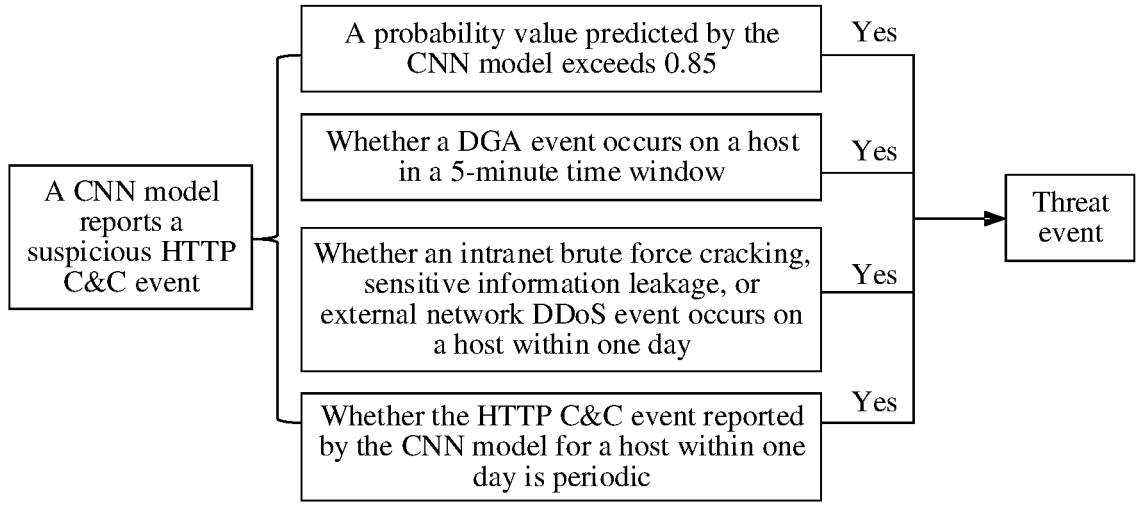
FIG. 8 is a schematic diagram of local analysis performed by a gateway device according to an embodiment of this application.

For example, as shown in FIG. 8, if a traffic flow does not hit an HTTP C&C blocking rule 1103, the gateway device inputs HTTP metadata into an HTTP C&C CNN model. The CNN model predicts, based on the input HTTP metadata, a probability value that the traffic flow is a malicious traffic flow. If the probability value predicted by the CNN model is greater than a threshold, the CNN model reports a suspicious HTTP C&C event; and in response to the suspicious HTTP C&C event, the gateway device performs an analysis method shown in FIG. 8.

Manner two provides a technical means of calibrating a malicious sample on a gateway device. When a traffic flow does not hit the blocking rule, the gateway device uses the two means of model and local analysis to jointly calibrate malicious samples, improving the accuracy of malicious samples.

How the first gateway device performs local analysis includes a plurality of specific implementations. The following uses Manner (2-A) to Manner (2-D) as examples to describe a local analysis manner.

Manner (2-A): The first gateway device performs local analysis based on the detection model before model training and a threshold.

Specifically, if the output result of the detection model before model training indicates that the probability value that the second traffic flow is a malicious traffic flow is greater than the threshold, the first gateway device determines that the second traffic flow is a malicious traffic flow. For example, as shown in FIG. 8, after the traffic flow enters the CNN model, if the probability value predicted by the CNN model exceeds 0.85, the CNN model reports a threat event, and metadata of the traffic flow enters a malicious sample set. 0.85 is an example of the threshold.

Manner (2-B): The first gateway device performs local analysis based on whether a DGA event exists.

Specifically, the first gateway device determines whether a DGA event generated in a first time period exists; and if the DGA event generated in the first time period exists, the first gateway device determines that the second traffic flow is a malicious traffic flow.

The first time period is a historical time period ending at a moment at which the first gateway device obtains the second traffic flow. For example, the first time period is a time window whose duration is 5 minutes, and an end point of the 5-minute time window is the moment at which the second traffic flow is obtained. The DGA event indicates that a first host accesses a DGA domain name. An event source included in the DGA event is the first host. The first host is a source host of the second traffic flow. For example, a source IP address of the second traffic flow is the first host. The DGA domain name is a random domain name generated using the DGA algorithm. DGA domain names are generally used for triggering network attacks, such as Botnet and C&C attacks.

For example, as shown in FIG. 8, after metadata of a traffic flow enters a gateway device, the gateway device determines whether a DGA event occurs on a host (a source host of the traffic flow) in the 5-minute time window. If the DGA event occurs on the host in the 5-minute time window, the gateway device determines that a threat event exists, and the gateway device adds the metadata of the traffic flow to the malicious sample set.

The first gateway device determines, in a plurality of manners, whether a DGA event exists. For example, the first gateway device establishes and stores an access record in a process of transmitting a traffic flow. When performing local analysis, the first gateway device queries the access record. If the access record records the DGA event generated in the first time period, the first gateway device determines that the DGA event exists. The access record is for indicating a correspondence between a traffic flow, an attack event, and a generation time of the attack event. For example, the access record includes metadata of the traffic flow, an identifier of the attack event, and the generation time of the attack event, and the first gateway device queries the access record based on the metadata of the second traffic flow and a second time period.

Manner (2-C): The first gateway device performs local analysis based on whether an intranet brute force cracking event, a sensitive information leakage event, or an external network DDoS event exists.

Specifically, the first gateway device determines whether an intranet brute force cracking event, a sensitive information leakage event, or an external network DDoS event that is generated in the second time period exists. If the intranet brute force cracking event generated in the second time period exists, the first gateway device determines that the second traffic flow is a malicious traffic flow; if the sensitive information leakage event generated in the second time period exists, the first gateway device determines that the second traffic flow is a malicious traffic flow; or if the external network DDoS event generated in the second time period exists, the first gateway device determines that the second traffic flow is a malicious traffic flow.

The second time period is a historical time period ending at a moment at which the first gateway device obtains the second traffic flow. For example, the second time period is a time window whose duration is one day, and an end point of the time window is the moment at which the second traffic flow is obtained.

The intranet brute force cracking event indicates that a brute force cracking attack targeting an intranet in which a first host is located occurs. The sensitive information leakage event indicates that a behavior of sending sensitive information on a first host to an external network occurs. The sensitive information on the first host is, for example, a user name or a password. The external network DDoS event indicates that a DDoS attack initiated by an intranet in which a first host is located to an external network occurs. The first host is a source host of the second traffic flow.

For example, as shown in FIG. 8, after metadata of a traffic flow enters a gateway device, the gateway device determines whether an intranet brute force cracking event, a sensitive information leakage event, or an external network DDoS event occurs on a host (a source host of the traffic flow) within one day. If the intranet brute force cracking event, the sensitive information leakage event, or the external network DDoS event occurs on the host within one day, the gateway device determines that a threat event exists, and the gateway device adds the metadata of the traffic flow to the malicious sample set.

Manner (2-D): The first gateway device performs local analysis based on whether an output result of the detection model before model training is periodic.

Specifically, the first gateway device obtains an output result of the detection model before model training in a third time period for metadata of a target traffic flow. If the output result of the detection model before model training in the third time period for the metadata of the target traffic flow is periodic, the first gateway device determines that the second traffic flow is a malicious traffic flow.

The third time period is a historical time period ending at a moment at which the first gateway device obtains the second traffic flow. For example, the third time period is a time window whose duration is one day, and an end point of the time window is the moment at which the second traffic flow is obtained. The target traffic flow includes at least one traffic flow that uses a first host as a source host. The first host is a source host of the second traffic flow.

For example, referring to FIG. 8, after metadata of a traffic flow enters a gateway device, the gateway device determines whether an HTTP C&C event reported by a CNN model for a host (a source host of the traffic flow) is periodic within one day. If the HTTP C&C event reported by the CNN model for the host is periodic within one day, the gateway device determines that a threat event exists, and adds the metadata of the traffic flow to the malicious sample set.

The foregoing Manner (2-A) to Manner (2-D) provide a plurality of technical means for how a gateway device locally analyzes and calibrates a malicious sample, which helps resolve a problem that malicious samples are difficult to obtain and helps collect more high-quality malicious samples.

In some embodiments, the four analysis manners shown in the foregoing Manner (2-A) to Manner (2-D) are used in combination. For example, when any one of the four analysis manners shown in Manner (2-A) to Manner (2-D) indicates that the second traffic flow is a malicious traffic flow, the first gateway device determines the metadata of the second traffic flow as a malicious sample. In other words, the four determining conditions expressed in Manner (2-A) to Manner (2-D) are combined by using an OR relationship. A manner using the foregoing Manner (2-A) to Manner (2-D) in combination may be referred to as correlation analysis.

The foregoing describes how the first gateway device performs local analysis in Manner two. In some embodiments, if the first gateway device determines through local analysis that the traffic flow is not a malicious traffic flow, an operation and maintenance personnel further analyzes the traffic flow in a manual analysis manner. For example, the first gateway device provides a world wide web access interface. If it is obtained through analysis that a traffic flow is not a malicious traffic flow, the first gateway device provides metadata of the traffic flow for the operation and maintenance personnel through the web access interface. The operation and maintenance personnel manually analyzes the traffic flow. If a manual analysis result is that the traffic flow is a malicious traffic flow, the first gateway device adds the metadata of the traffic flow to the malicious sample set. If the manual analysis result is that the traffic flow is a normal traffic flow, the first gateway device adds the metadata of the traffic flow to the normal sample set.

In some embodiments, the first gateway device further calibrates a normal sample by using the detection model before model training. For example, if the traffic flow does not hit the blocking rule, the first gateway device inputs the metadata of the traffic flow into the detection model before model training; and if an output result of the detection model before model training indicates that the traffic flow is not a suspicious traffic flow, the first gateway device determines the metadata of the traffic flow as a normal sample.

For example, referring to FIG. 8, if a traffic flow does not hit an HTTP C&C blocking rule 1102, the gateway device inputs HTTP metadata into an HTTP C&C CNN model. The CNN model predicts, based on the input HTTP metadata, a probability value that the traffic flow is a malicious traffic flow. If the probability value predicted by the CNN model is less than a threshold, the CNN model does not report a suspicious HTTP C&C event, and metadata of the traffic flow is added to the normal sample set.

Manner three: The first gateway device requests a cloud to perform threat analysis to obtain a malicious sample.

For example, as shown in FIG. 7, if a traffic flow does not hit the HTTP C&C blocking rule 1102, in a case that the gateway device cannot determine whether the traffic flow is a malicious traffic flow, the gateway device 110 sends context information of the traffic flow to the enterprise private cloud 130 and requests the enterprise private cloud 130 to perform threat analysis. In response to the request of the gateway device 110, the enterprise private cloud 130 performs threat analysis based on the context information of the traffic flow. The enterprise private cloud 130 determines whether the traffic flow is a malicious traffic flow or a normal traffic flow, and obtains an analysis result. The enterprise private cloud 130 returns the analysis result to the gateway device 110. After the gateway device 110 receives the analysis result from the enterprise private cloud 130, the gateway device 110 determines, based on the analysis result of the enterprise private cloud 130, whether the traffic flow is a malicious traffic flow or a normal traffic flow. If the gateway device 110 finds, based on the analysis result of the enterprise private cloud 130, that the traffic flow is a malicious traffic flow, the gateway device 110 adds metadata of the malicious traffic flow to the malicious sample set. If the gateway device 110 finds, based on the analysis result of the enterprise private cloud 130, that the traffic flow is a normal traffic flow, the gateway device 110 adds metadata of the normal traffic flow to the normal sample set.

Specifically, if a third traffic flow does not hit the blocking rule and it is determined through analysis that the third traffic flow is not a malicious traffic flow, the first gateway device sends context information of the third traffic flow to a second server; the second server receives the context information of the third traffic flow from the first gateway device; the second server performs analysis based on the context information to obtain an analysis result; and the second server sends the analysis result to the first gateway device. The first gateway device receives the analysis result obtained from the second server based on the context information; and if the analysis result indicates that the third traffic flow is a malicious traffic flow, the first gateway device determines metadata of the third traffic flow as a malicious sample.

The third traffic flow is one traffic flow in the at least one traffic flow obtained by the first gateway device. The context information includes at least one of the metadata of the third traffic flow or a packet capture (PCAP) packet of the third traffic flow.

The analysis result is for indicating whether the third traffic flow is a malicious traffic flow. For example, the analysis result includes two values. One value indicates that the third traffic flow is a malicious traffic flow, and the other value indicates that the third traffic flow is not a malicious traffic flow.

How the cloud analyzes whether a traffic flow is a malicious traffic flow includes a plurality of manners. In some embodiments, the cloud analyzes the traffic flow based on threat intelligence.

Threat intelligence is evidence-based knowledge of existing or potential threats to Internet technology (IT) or information assets. Content of the threat intelligence includes at least one of a malicious IP address, a normal IP address, a malicious domain name, and a malicious file identifier. The malicious IP address and the normal IP address are two types of IP addresses. A user with a malicious IP address performs malicious behaviors such as network attacks that endanger services. The malicious IP address is also referred to as a black IP. The normal IP address refers to an IP address used by a common user. The normal IP address is also referred to as a white IP. The malicious domain name is for conducting a network attack. For example, the malicious domain name is a domain name used by malicious software (such as a mining virus, a Botnet, or a ransomware virus) to maintain communication between a controlled terminal and a control server. The malicious file identifier is for identifying a malicious file. For example, the malicious file identifier is a message-digest algorithm (MD5) code of the malicious file.

The following uses an example in which the cloud is the second server to describe how the cloud performs analysis based on threat intelligence in Manner (3-A) to Manner (3-C).

Manner (3-A): The cloud performs analysis based on threat intelligence including a malicious IP address.

For example, if the third traffic flow does not hit the blocking rule and it is determined through analysis that the third traffic flow is not a malicious traffic flow, the second server queries first threat intelligence based on a destination IP address included in the third traffic flow or a source IP address included in the third traffic flow. If the destination IP address or the source IP address hits a malicious IP address in the first threat intelligence, the second server uses that the third traffic flow is a malicious traffic flow as an analysis result. If the destination IP address or the source IP address hits a normal IP address in the first threat intelligence, the second server uses that the third traffic flow is not a malicious traffic flow as an analysis result.

The first threat intelligence includes at least one malicious IP address and at least one normal IP address.

Manner (3-B): The cloud performs analysis based on threat intelligence including a malicious domain name.

Specifically, if the third traffic flow does not hit the blocking rule and it is determined through analysis that the third traffic flow is not a malicious traffic flow, the second server queries second threat intelligence based on a target domain name corresponding to the third traffic flow. If the target domain name hits a malicious domain name in the second threat intelligence, the second server uses that the third traffic flow is a malicious traffic flow as an analysis result. If the target domain name hits a normal domain name in the second threat intelligence, the second server uses that the third traffic flow is not a malicious traffic flow as an analysis result. The second threat intelligence includes at least one malicious domain name and at least one normal domain name. The malicious domain name is also referred to as a black domain name, and the normal domain name is also referred to as a white domain name. The target domain name is a domain name that the third traffic flow requests to access.

Manner (3-C): The cloud performs analysis based on threat intelligence including a malicious file identifier.

Specifically, if the third traffic flow does not hit the blocking rule and it is determined through analysis that the third traffic flow is not a malicious traffic flow, the second server queries third threat intelligence based on a file identifier corresponding to the third traffic flow. If the file identifier hits a malicious file identifier in the third threat intelligence, the second server uses that the third traffic flow is a malicious traffic flow as an analysis result. The third threat intelligence includes at least one malicious file identifier.

Figure 9:
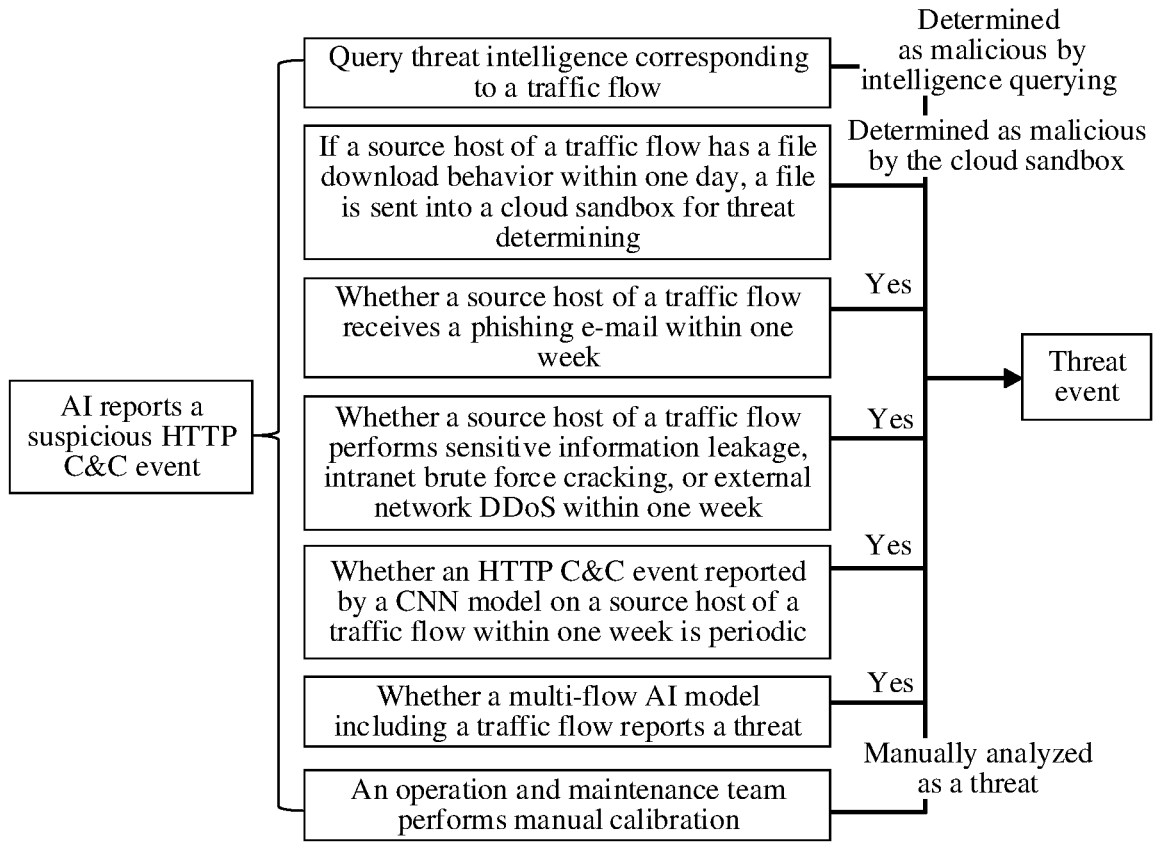
FIG. 9 is a schematic diagram of cloud analysis according to an embodiment of this application.

In some embodiments, the cloud not only analyzes the traffic flow by using the threat intelligence, but also further analyzes the traffic flow in a manner similar to the local analysis performed by the gateway device. For example, as shown in FIG. 9, a cloud analysis process specifically includes the following Manner (3-1) to Manner (3-7).

Manner (3-1): The cloud queries threat intelligence corresponding to the traffic flow. If it is found by querying the threat intelligence that the traffic flow is a malicious traffic flow, the cloud uses that the traffic flow is a malicious traffic flow as an analysis result. For a specific implementation of Manner (3-1), refer to the foregoing Manner (3-A) to Manner (3-C).

Manner (3-2): The cloud determines whether a host (a source host of the traffic flow) has a file download behavior within one day. If the host has a file download behavior within one day, the cloud obtains a file downloaded by the host from the traffic flow. The cloud device sends the file to a cloud sandbox and runs the file through the cloud sandbox. If the cloud sandbox determines that the file is a malicious file, the cloud determines that a threat event exists, and the cloud uses that the traffic flow is a malicious traffic flow as an analysis result.

Manner (3-3): The cloud determines whether a source host of the traffic flow receives a phishing e-mail within one day. If the source host of the traffic flow receives a phishing e-mail within one day, the cloud determines that a threat event exists, and the cloud uses that the traffic flow is a malicious traffic flow as an analysis result.

Manner (3-4): The cloud determines whether an intranet brute force cracking event, a sensitive information leakage event, or an external network DDoS event occurs on a source host of the traffic flow within one week. If an intranet brute force cracking event, a sensitive information leakage event, or an external network DDoS event occurs on the source host of the traffic flow within one week, the cloud determines that a threat event exists, and the cloud uses that the traffic flow is a malicious traffic flow as an analysis result.

Manner (3-5): The cloud determines whether an HTTP C&C event reported by a CNN model for a source host of the traffic flow is periodic within one week. If the HTTP C&C event reported by the CNN model for the source host of the traffic flow is periodic within one week, the cloud determines that a threat event exists, and the cloud uses that the traffic flow is a malicious traffic flow as an analysis result. Manner (3-5) is the same as the foregoing Manner (2-D).

Manner (3-6): The cloud device determines whether a multi-stream AI model including the traffic flow reports a threat event. If the multi-stream AI model reports a threat event, the cloud device determines that a threat event exists, and the cloud device uses that the traffic flow is a malicious traffic flow as an analysis result.

Manner (3-7): An operation and maintenance team of the cloud manually analyzes the traffic flow. If the operation and maintenance team manually analyzes that the traffic flow is a malicious traffic flow, the cloud uses that the traffic flow is a malicious traffic flow as an analysis result.

In some embodiments, the foregoing Manner (3-1) to Manner (3-7) are used in combination. For example, if a threat level is higher than a threshold, when any one of Manner (3-1) to Manner (3-7) indicates that the traffic flow is a malicious traffic flow, the first gateway device determines the metadata of the traffic flow as a malicious sample. If the threat level is lower than the threshold, when a plurality of manners in Manner (3-1) to Manner (3-7) indicate that the traffic flow is a malicious traffic flow, the first gateway device determines the metadata of the traffic flow as a malicious sample. In other words, whether the 7 conditions shown in Manner (3-1) to Manner (3-7) are combined in an OR relationship or in an AND relationship is determined based on the threat level. This is not limited in this embodiment.

The foregoing Manner (3-1) to Manner (3-7) provide a plurality of implementations for how the cloud performs analysis. Because the cloud performs threat determining in a plurality of manners, the accuracy of the determined malicious sample is improved.

The foregoing describes a cloud threat analysis process in Manner three. If the cloud determines that a threat event occurs based on the traffic flow, the metadata of the traffic flow enters the malicious sample set. If the operation and maintenance team of the cloud in Manner (3-7) manually analyzes that the traffic flow is a normal access traffic flow, the metadata of the traffic flow enters the normal sample set.

In some other embodiments, an action of performing analysis by using threat intelligence is locally performed by a gateway device. For example, the gateway device is physically integrated with a private cloud server. The gateway device includes performance and a storage capacity required for querying threat intelligence, and the gateway device replaces the cloud to calibrate malicious samples based on the threat intelligence. The following uses an example to describe how a gateway device performs analysis by using threat intelligence in Manner (3-a) to Manner (3-c).

Manner (3-a): The gateway device performs analysis based on threat intelligence including a malicious IP address.

For example, if the third traffic flow does not hit the blocking rule and it is determined through analysis that the third traffic flow is not a malicious traffic flow, the first gateway device queries first threat intelligence based on a destination IP address included in the third traffic flow or a source IP address included in the third traffic flow; and if the destination IP address included in the third traffic flow or the source IP address included in the third traffic flow hits a malicious IP address in the first threat intelligence, the first gateway device determines metadata of the third traffic flow as a malicious sample.

Manner (3-b): The gateway device performs analysis based on threat intelligence including a malicious domain name.

If the third traffic flow does not hit the blocking rule and it is determined through analysis that the third traffic flow is not a malicious traffic flow, the first gateway device queries second threat intelligence based on a target domain name corresponding to the third traffic flow; and if the target domain name corresponding to the third traffic flow hits a malicious domain name in the second threat intelligence, the first gateway device determines metadata of the third traffic flow as a malicious sample. The target domain name is a domain name that the third traffic flow requests to access, and the second threat intelligence includes at least one malicious domain name.

Manner (3-c): The gateway device performs analysis based on threat intelligence including a malicious file identifier.

If the third traffic flow does not hit the blocking rule and it is determined through analysis that the third traffic flow is not a malicious traffic flow, the first gateway device queries third threat intelligence based on a file identifier corresponding to the third traffic flow; and if the file identifier corresponding to the third traffic flow hits a malicious file identifier in the third threat intelligence, the first gateway device determines metadata of the third traffic flow as a malicious sample. The file identifier is for identifying a file included in the third traffic flow, and the third threat intelligence includes at least one malicious file identifier.

In some embodiments, the foregoing Manner one to Manner three are used in combination. Optionally, two or more of Manner one to Manner three are combined in an OR relationship. Alternatively, optionally, two or more of Manner one to Manner three are combined in an AND relationship. How to combine the three manners is not limited in this embodiment. In an example in which Manner one and Manner two are combined in an AND relationship, for example, the first gateway device obtains a malicious sample based on the blocking rule, the detection model before model training, and local analysis.

The foregoing describes the technical solution from the gateway device side by using the method 500 as an example. The following describes the technical solution from the server side by using the method 600 as an example. In other words, the method 600 relates to how a server aggregates model parameters on gateway devices participating in federated learning. The method 600 mainly describes a procedure performed by the server when two gateway devices participate in federated learning, and reflects how the server aggregates model parameters reported by the two gateway devices. When more gateway devices participate in federated learning, a method performed by the server is similar.

Figure 10:
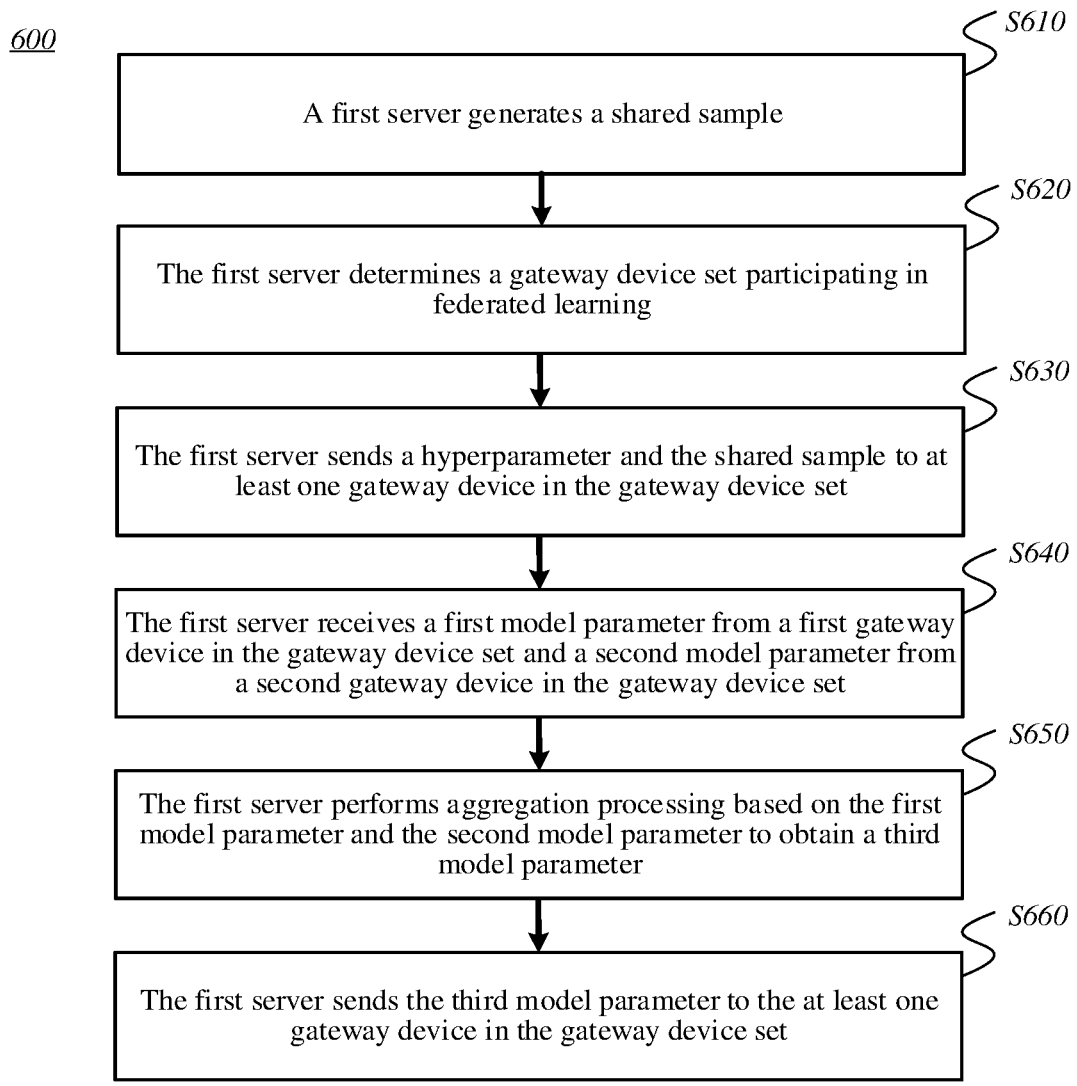
FIG. 10 is a flowchart of a training method for a detection model according to an embodiment of this application.

FIG. 10 is a flowchart of a training method 600 for a detection model according to an embodiment of this application.

For example, the method 600 includes S610 to S660.

S610: A first server generates a shared sample.

In some embodiments, the shared sample is generated by a sandbox. For example, the first server runs a malicious file in the sandbox, to obtain at least one PCAP packet; and the first server generates the shared sample based on the at least one PCAP packet. For example, as shown in FIG. 1 or FIG. 7, for a C&C traffic flow, the attack knowledge base production system 1201 selects a malicious PE sample from a malicious traffic flow. The attack knowledge base production system 1201 executes the malicious PE sample by using a sandbox cultivation system to obtain PCAP packets; and the attack knowledge base production system 1201 forms the C&C traffic flow with the PCAP packets. In some other embodiments, the shared sample is collected from a friendly enterprise. For example, the first server obtains the shared sample from data generated by an HTTP C&C threat event collected from a friendly enterprise.

S620: The first server determines a gateway device set participating in federated learning.

The first server determines some gateway devices as participants of federated learning, and schedules these gateway devices to perform model training.

There are a plurality of implementations for the first server determines gateway devices participate in federated learning. In some embodiments, the first server determines, based on at least one of a computing capability, a resource status, communication bandwidth, or data quality of each gateway device, a gateway device participating in federated learning. For example, the first server determines, based on a computing capability requirement of model training, a gateway device whose computing capability meets the requirement. For another example, the first server determines, based on resource utilization of each gateway device, a gateway device whose resource utilization is less than a utilization threshold. For another example, the first server determines, based on a communication bandwidth of each gateway device, a gateway device whose communication bandwidth is greater than a bandwidth threshold. For another example, the first server determines, based on data quality of each gateway device, a gateway device whose data quality is higher than a quality threshold.

S630: The first server sends a hyperparameter and the shared sample to at least one gateway device in the gateway device set.

For example, the first server periodically (for example, once a month) starts a model training task, and delivers the hyperparameter of the detection model and the shared sample to the selected gateway device.

The shared sample is a malicious sample provided by the server for each gateway device in the gateway device set, and the hyperparameter includes an initial parameter and a learning rate.

The initial parameter is an initial parameter of the first detection model and the second detection model. The learning rate is a learning rate of the first detection model and the second detection model. The first detection model refers to a detection model trained and applied by the first gateway device. The first detection model is configured to detect whether a traffic flow transmitted through the first gateway device is malicious. The second detection model refers to a detection model trained and applied by the second gateway device. The second detection model is configured to detect whether a traffic flow transmitted through the second gateway device is malicious. The first detection model and the second detection model have a same initial parameter. For example, the first detection model and the second detection model have a same learning rate.

S640: The first server receives a first model parameter from a first gateway device in the gateway device set and a second model parameter from a second gateway device in the gateway device set.

The gateway device set includes the first gateway device and the second gateway device. Optionally, the gateway device set further includes another gateway device other than the first gateway device and the second gateway device. The first model parameter is a parameter of the first detection model. The second model parameter is a parameter of the second detection model. Optionally, the first model parameter is a gradient value of the first detection model. The second model parameter is a gradient value of the second detection model.

S650: The first server performs aggregation processing based on the first model parameter and the second model parameter to obtain a third model parameter.

In some embodiments, an aggregation processing process includes the following steps one to three.

Step one: The first server obtains an average value of the first model parameter and the second model parameter.

Step two: The first server obtains a variation of a model parameter based on the average value and a learning rate.

For example, the variation of the model parameter is a product of an average value of the model parameters and the learning rate.

Step three: The first server updates a historical model parameter based on the variation to obtain the third model parameter.

For example, the first server calculates a difference between the historical model parameter and the variation of the model parameter, and uses the difference as the third model parameter. The third model parameter is a difference between the historical model parameter and the variation. The historical model parameter is a model parameter sent by the first server to the at least one gateway device in the gateway device set before the first server receives the first model parameter and the second model parameter.

S660: The first server sends the third model parameter to the at least one gateway device in the gateway device set.

Optionally, the first server sends the third model parameter to at least one of the first gateway device or the second gateway device; or the first server sends the third model parameter to one or more gateway devices other than the first gateway device and the second gateway device. Alternatively, the first server sends the third model parameter to all gateway devices in the gateway device set.

In the foregoing step S640 to step S660, a case in which two gateway devices participate in federated learning is used as an example to describe how the server aggregates model parameters reported by the two gateway devices. By analogy, the method procedure described in the foregoing steps can be applied to a scenario in which model parameters reported by more gateway devices are aggregated. The following uses an example to describe how the server aggregates model parameters reported by n gateway devices, and n is a positive integer greater than or equal to 2.

For example, in the $t^{th}$ iteration of n iterations, after n gateway devices participating in federated learning report local model parameters to the server, the server performs aggregation processing on the model parameters reported by the n gateway devices. Specifically, the server calculates a minimum local loss function based on the following Formula (2) and Formula (3), to obtain an updated model parameter $w_G^{t+1}$. Then, the server sends the updated model parameter $w_G^{t+1}$ to the n gateway devices, so that a model parameter on each gateway device participating in federated learning is updated.

$$w_{t+1} \leftarrow w_t - \eta \sum_{k=1}^{K} \frac{n_k}{n} g_k; \qquad \text{Formula (2)}$$

$$L(w_G^t) = \frac{1}{n} \sum_{i=1}^{N} L(w_i^t); \qquad \text{Formula (3)}$$

$w_{t+1}$ represents a model parameter obtained by performing aggregation processing in the $t^{th}$ iteration, or an updated model parameter obtained in the $t^{th}$ iteration. $w_t$ represents a historical model parameter used for the $t^{th}$ iteration. For example, $w_t$ is a model parameter sent to the gateway device in the $(t-1)^{th}$ iteration.

$$\eta \sum_{k=1}^{K} \frac{n_k}{n} g_k$$

is the variation of the model parameter in the $t^{th}$ iteration. η represents the learning rate, and $$\sum_{k=1}^{K}\frac{n_k}{n}g_k$$

represents the average value of model parameters. n represents a quantity of gateway devices participating in federated learning. k represents that calculation is performed for a $k^{th}$ gateway device participating in federated learning. Σ is a sum symbol. $g_k$ represents an average gradient of a model parameter calculated by the $k^{th}$ gateway device participating in federated learning to local data, and $g_k=\nabla F_k(w_t)$. $\nabla$ represents gradient calculation. L represents a loss function. $w_G^t$ represents a model parameter in the $t^{th}$ iteration. $w_i^t$ represents a model parameter of the gateway device i before update in the $t^{th}$ iteration. In addition, in Formula (2) and Formula (3), $$\sum_{k=1}^{K}\frac{n_k}{n}g_k=\nabla f(w_t).$$

Formula (2) and Formula (3) are examples of updating a model parameter by using a distributed gradient descent algorithm based on a fixed learning rate. In Formula (2) and Formula (3), it is assumed that samples owned by different gateway devices participating in federated learning meet an IID condition, different gateway devices participating in federated learning have initial parameters of a detection model, and each gateway device participating in federated learning knows a setting of an optimizer (for example, a distributed gradient descent algorithm).

In the n iterations, the foregoing steps of receiving the model parameter sent by each gateway device, aggregating the model parameter on each gateway device, and delivering the aggregated model parameter to each gateway device are repeatedly performed until the loss function is converged or the accuracy reaches an accuracy threshold.

In the method provided in this embodiment, a server receives a model parameter uploaded by each gateway device, performs aggregation processing on the model parameter uploaded by each gateway device, and delivers the model parameter obtained after the aggregation processing to each gateway device, so that a gateway device performs model training by using the model parameter obtained after the aggregation processing, thereby improving a model training effect of the gateway device, and further improving performance of a detection model obtained through training.

The foregoing describes the method on the model training side by using the method 500 and the method 600. The following describes the method on the model application side.

The detection model provided in this embodiment is used by a gateway device to detect whether a traffic flow subsequently transmitted through the gateway device is malicious. For example, after the first gateway device obtains the first detection model through training, the first gateway device stores the first detection model. When the first network device subsequently receives a traffic flow, the first gateway device extracts metadata of the traffic flow. The first network device inputs the metadata of the traffic flow into the first detection model, processes the metadata of the traffic flow by using the first detection model, and outputs a type of the traffic flow or a probability value that the traffic flow is a malicious traffic flow. If the type of the traffic flow is a malicious traffic flow or the probability value that the traffic flow is a malicious traffic flow is greater than a threshold, the first gateway device determines that the traffic flow is a malicious traffic flow. If the type of the traffic flow is a normal traffic flow or the probability value that the traffic flow is a malicious traffic flow is less than the threshold, the first gateway device determines that the traffic flow is a normal traffic flow.

The following uses an example in which the detection model is a CNN model to describe how to specifically apply the detection model to detect a traffic flow.

Figure 11:
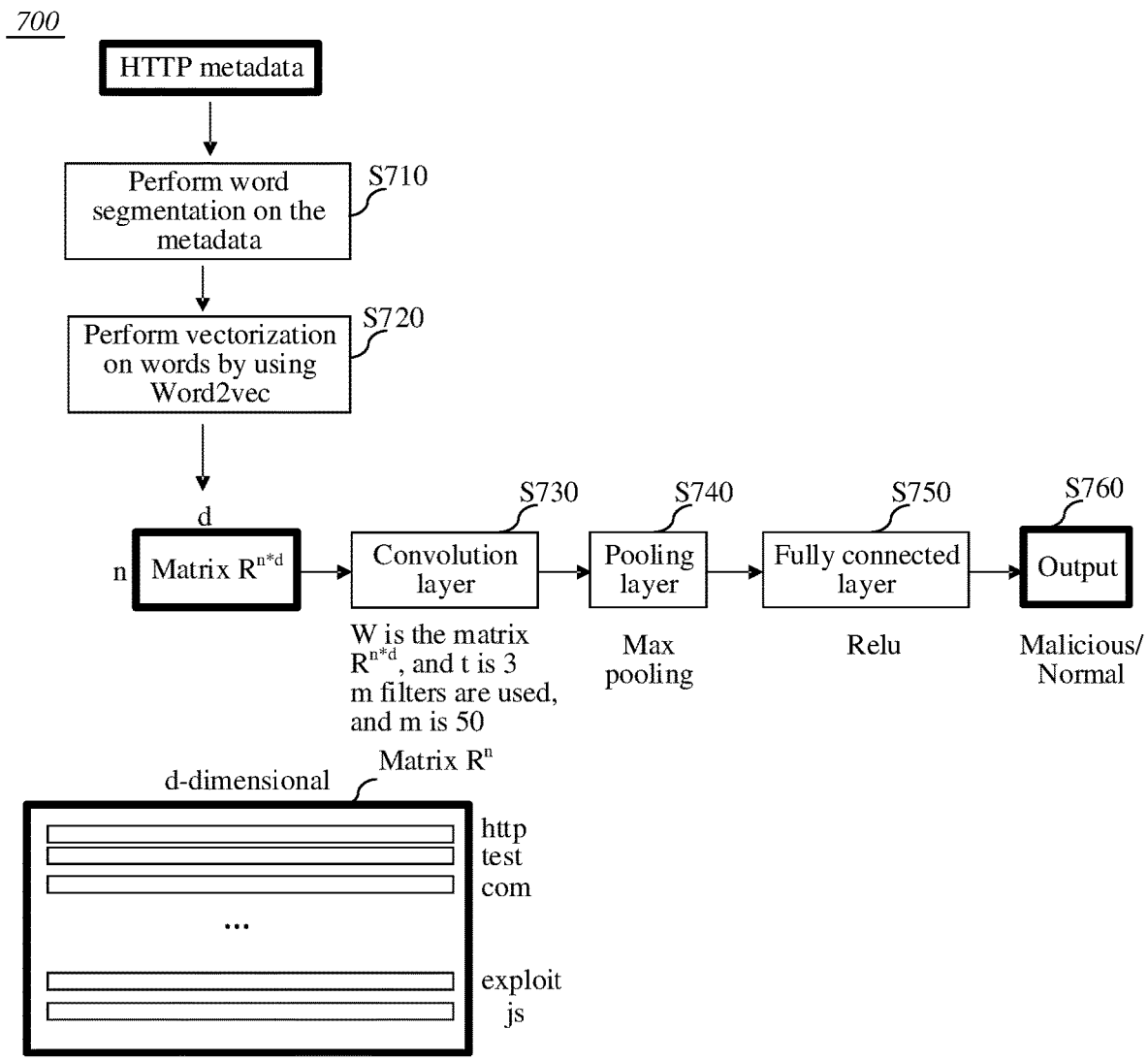
FIG. 11 is a schematic diagram in which a gateway device detects a traffic flow by using a CNN model according to an embodiment of this application.

For example, as shown in FIG. 11, a process 700 in which a gateway device detects a traffic flow by using a CNN model includes the following step S710 to step S760. Step S710 and step S720 describe how the gateway device preprocesses input data. By performing step S710 and step S720, the gateway device can convert a data form of metadata of the traffic flow from a character string into a matrix, so that a convolution layer of the detection model processes the metadata in the matrix form. Step S710 and step S720 are about various processing actions sequentially performed by each layer in the CNN model on the metadata. Optionally, step S710 and step S720 are performed by using a layer built in the detection model. Alternatively, step S710 and step S720 are performed by using a preprocessing module disposed separately from the detection model.

Step S710: The gateway device performs word segmentation on HTTP metadata of the traffic flow by using a segmentation symbol, so as to obtain a plurality of words included in the HTTP metadata.

For example, the segmentation symbol includes: '(', ')', '{', '}', '/', '\', '@', and '='. For example, the HTTP metadata of the traffic flow is http://test.com/path/file?key=pasword&get=exploit.js, and after the HTTP metadata is segmented by using the segmentation symbol, http, test, com, path, file, key, paS6word, get, exploit, and js are obtained; and http, test, com, path, file, key, paS6word, get, exploit and js are examples of the words obtained through segmentation.

Step S720: The gateway device performs vectorization on each word by using a model (word to vector, Word2vec) configured to generate a word vector, so as to obtain a matrix.

The matrix includes a plurality of rows. Each row in the matrix is a vector, and each vector represents a word.

In some embodiments, a quantity of rows of the matrix is preset to n. If a quantity of obtained words exceeds n, the gateway device selects the first n words from all the obtained words, and the gateway device separately performs vectorization on the first n words to obtain an n-row matrix; or if a quantity of obtained words is less than n, the gateway device separately performs vectorization on all the obtained words and fill them with 0 respectively to obtain the matrix. For example, after the gateway device separately performs vectorization on http, test, com, path, file, key, paS6word, get, exploit and js, the obtained matrix includes n rows and d dimensions. The first row of the matrix represents a d-dimensional vector of http; the second row of the matrix represents a d-dimensional vector of test; the third row of the matrix represents a d-dimensional vector of com; and so on. The second last row of the matrix represents a d-dimensional vector of exploit, and the last row of the matrix represents a d-dimensional vector of js.

For example, as shown in FIG. 11, the gateway device obtains a matrix Rn*d after performing step S720. The matrix Rn*d is a matrix with n rows and d dimensions, where d represents a quantity of dimensions of the vector; and n represents a number of rows in the matrix.

Step S730: The gateway device performs convolution processing on the matrix by using a convolution layer of the CNN model, to obtain a traffic flow feature.

The traffic flow feature is a feature indicated by metadata of the traffic flow. A form of the traffic flow feature is, for example, a vector or a matrix.

The convolution layer of the CNN model includes a plurality of filters. A weight of each filter is a matrix. A quantity of dimensions of the matrix corresponding to each filter is the same as the quantity of dimensions of the matrix obtained in step S720. For example, the weight of each filter is a matrix Rt*d. The matrix Rt*d is a matrix with t rows and d dimensions, where t=3. A quantity of filters included in the convolution layer is, for example, 50.

Step S740: The gateway device performs maximum pooling processing on the traffic flow feature by using a pooling layer of the CNN model, to obtain a pooled feature.

Step S750: The gateway device performs linear mapping and non-linear mapping on the traffic flow feature by using a fully connected layer of the CNN model, to obtain a mapped feature.

For example, linear mapping and non-linear mapping are implemented by using a rectified linear unit (ReLU) or another activation function.

Step S760: The gateway device classifies the mapped feature by using an output layer of the CNN model, and outputs a type of the traffic flow, where the type of the traffic flow is a malicious traffic flow or a normal traffic flow.

The foregoing describes the method embodiments in embodiments of this application. The following describes a gateway device and a server in embodiments of this application from a perspective of a logical function.

A gateway device 800 described below includes any function of the first gateway device in the foregoing method 500.

Figure 12:
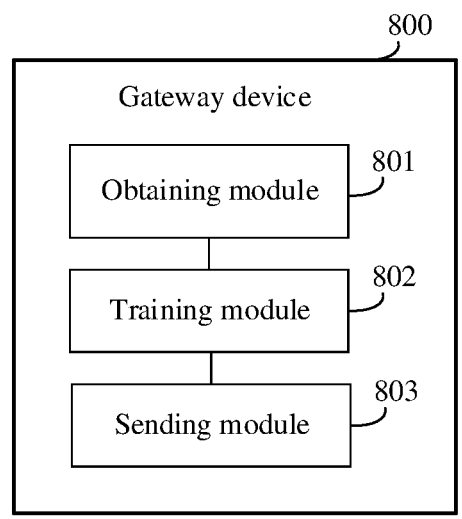
FIG. 12 is a schematic diagram of a structure of a gateway device according to an embodiment of this application.

FIG. 12 is a schematic diagram of a possible structure of the first gateway device in the foregoing embodiments. The gateway device 800 shown in FIG. 12 implements, for example, functions of the first gateway device in the method 500.

As shown in FIG. 12, the gateway device 800 includes an obtaining module 801, a training module 802, and a sending module 803. All or some of the modules in the gateway device 800 are implemented by using software, hardware, firmware, or any combination thereof. Each module in the gateway device 800 is configured to perform a corresponding function of the first gateway device in the method 500. Specifically, the obtaining module 801 is configured to support the gateway device 800 in performing S510, S520, and S550. The training module 802 is configured to support the gateway device 800 in performing S560. The sending module 803 is configured to support the gateway device 800 in performing S570.

In this embodiment of this application, module division is an example, and is merely logical function division. In an actual implementation, optionally, another division manner may be used.

In some embodiments, the modules in the gateway device 800 are integrated into one module. For example, the modules in the gateway device 800 are integrated on a same chip. The chip includes a processing circuit, and an input interface and an output interface that are internally connected to and communicate with the processing circuit. The training module 802 is implemented by using the processing circuit in the chip. The obtaining module 801 is implemented by using the input interface in the chip. The sending module 803 is implemented by using the output interface in the chip. For example, the chip is implemented by using any combination of one or more field-programmable gate arrays (FPGAs), a programmable logic device (PLD), a controller, a state machine, gate logic, a discrete hardware component, any other appropriate circuit, or a circuit that can perform various functions described in this application.

In some other embodiments, each module of the gateway device 800 exists alone physically. In some other embodiments, some modules of the gateway device 800 exist alone physically, and the other modules are integrated into one module.

When the gateway device 800 is implemented by using hardware, the training module 802 in the gateway device 800 is implemented, for example, by using the processor 201 in the device 200. The obtaining module 801 and the sending module 803 in the gateway device 800 are implemented, for example, by using the network interface 204 in the device 200.

When the gateway device 800 is implemented by using software, each module in the gateway device 800 is, for example, software generated after the processor 201 in the device 200 reads the program code 210 stored in the memory 203. For example, the gateway device 800 is a virtualized device. The virtualized device includes but is not limited to at least one of a virtual machine, a container, and a pod. In some embodiments, the gateway device 800 is deployed on a hardware device (for example, a physical server) in a form of a virtual machine. For example, the gateway device 800 is implemented based on a general-purpose physical server in combination with a network functions virtualization (NFV) technology. When implemented as a virtual machine, the gateway device 800 is, for example, a virtual host, a virtual router, or a virtual switch. After reading this application, with reference to the NFV technology, a person skilled in the art may virtualize the gateway device 800 on a general-purpose physical server. In some other embodiments, the gateway device 800 is deployed on a hardware device in a form of a container (for example, a docker container). For example, the procedure that the gateway device 800 performs the foregoing method embodiments is encapsulated in an image file, and the hardware device creates the gateway device 800 by running the image file. In some other embodiments, the gateway device 800 is deployed on a hardware device in a form of a pod. The pod includes a plurality of containers, and each container is configured to implement one or more modules in the gateway device 800.

A server 900 described below includes any function of the first server in the foregoing method 700.

Figure 13:
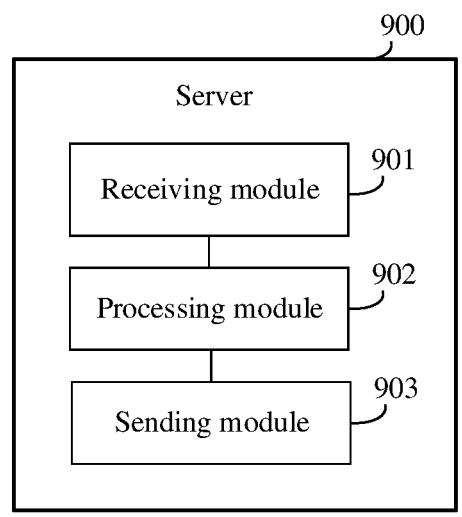
FIG. 13 is a schematic diagram of a structure of a server according to an embodiment of this application.

FIG. 13 is a schematic diagram of a possible structure of the first server in the foregoing embodiments. The server 900 shown in FIG. 13 implements, for example, functions of the first server in the method 700.

As shown in FIG. 13, the server 900 includes a receiving module 901, a processing module 902, and a sending module 903. All or some of the modules in the server 900 are implemented by using software, hardware, firmware, or any combination thereof. Each module in the server 900 is configured to perform a corresponding function of the first server in the foregoing method 700. Specifically, the receiving module 901 is configured to support the server 900 in performing S640. The processing module 902 is configured to support the server 900 in performing S650. The sending module 903 is configured to support the server 900 in performing S660.

Optionally, the receiving module 901, the processing module 902, or the sending module 903 is further configured to support the server 900 in performing other processes performed by the first server in the technology described in this specification. For example, the processing module 902 is further configured to support the server 900 in performing S610 or S620. The sending module 903 is further configured to support the server 900 in performing S660. For a specific execution process of the server 900, refer to the detailed descriptions of corresponding steps in the method 700, and details are not described herein again.

In this embodiment of this application, module division is an example, and is merely logical function division. In an actual implementation, optionally, another division manner may be used.

In some embodiments, the modules in the server 900 are integrated into one processing module. For example, the modules in the server 900 are integrated on a same chip. The chip includes a processing circuit, and an input interface and an output interface that are internally connected to and communicate with the processing circuit. The processing module 902 is implemented by using the processing circuit in the chip. The receiving module 901 is implemented by using the input interface in the chip. The sending module 903 is implemented by using the output interface in the chip. For example, the chip is implemented by using any combination of one or more field-programmable gate arrays (FPGAs), a programmable logic device (PLD), a controller, a state machine, gate logic, a discrete hardware component, any other appropriate circuit, or a circuit that can perform various functions described in this application.

In some other embodiments, each module of the server 900 exists alone physically. In some other embodiments, some modules of the server 900 exist alone physically, and the other modules are integrated into one module. For example, in some embodiments, the processing module 902 and the sending module 903 are a same module. In some other embodiments, the processing module 902 and the sending module 903 are different modules. In some embodiments, integration of different modules is implemented in a form of hardware, that is, different modules correspond to same hardware. For another example, integration of different modules is implemented in a form of a software module.

When the server 900 is implemented by using hardware, the processing module 902 in the server 900 is implemented, for example, by using the processor 201 in the device 200. The receiving module 901 and the sending module 903 in the server 900 are implemented, for example, by using the network interface 204 in the device 200.

When the server 900 is implemented by using software, each module in the server 900 is, for example, software generated after the processor 201 in the device 200 reads the program code 210 stored in the memory 203. For example, the server 900 is a virtualized device. The virtualized device includes but is not limited to at least one of a virtual machine, a container, and a pod. In some embodiments, the server 900 is deployed on a hardware device (for example, a physical server) in a form of a virtual machine. For example, the server 900 is implemented based on a general-purpose physical server in combination with an NFV technology. When implemented as a virtual machine, the server 900 is, for example, a virtual host, a virtual router, or a virtual switch. After reading this application, with reference to the NFV technology, a person skilled in the art may virtualize the server 900 on a general-purpose physical server. In some other embodiments, the server 900 is deployed on a hardware device in a form of a container (for example, a docker container). For example, the procedure that the server 900 performs the foregoing method embodiments is encapsulated in an image file, and the hardware device creates the server 900 by running the image file. In some other embodiments, the server 900 is deployed on a hardware device in a form of a pod. The pod includes a plurality of containers, and each container is configured to implement one or more modules in the server 900.

In some embodiments, a computer program product is provided. The computer program product includes computer instructions, and the computer instructions are stored in a computer-readable storage medium. A processor of a gateway device reads the computer instructions from the computer-readable storage medium, and the processor executes the computer instructions, to cause the gateway device to perform the method 500.

In some embodiments, a computer program product is provided. The computer program product includes computer instructions, and the computer instructions are stored in a computer-readable storage medium. A processor of a server reads the computer instructions from the computer-readable storage medium, and the processor executes the computer instructions, to cause the server to perform the method 600.

A person of ordinary skill in the art may be aware that, the method steps and units described in combination with the embodiments described in this specification may be implemented by electronic hardware, computer software, or a combination thereof. To clearly describe the interchangeability between hardware and software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for convenient and brief descriptions, for a detailed working process of the foregoing system, apparatus, and module, refer to a corresponding process in the foregoing method embodiments. Details are not described herein again.

In the several embodiments provided in this application, it should be understood that the disclosed system, apparatus, and method may be implemented in other manners. For example, the foregoing described apparatus embodiment is merely an example. For example, the module division is merely logical function division and there may be other division manners in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separated, and parts displayed as modules may or may not be physical modules, may be located in one position, or may be distributed on a plurality of network modules. Some or all of the modules may be selected based on actual requirements to achieve the objectives of the solutions in embodiments of this application.

In addition, modules in embodiments of this application may be integrated into one processing module, or each of the modules may exist alone physically, or two or more modules may be integrated into one module. The integrated module may be implemented in a form of hardware, or may be implemented in a form of a software module.

When the integrated module is implemented in the form of a software functional module and sold or used as an independent product, the integrated module may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for indicating a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

In embodiments of this application, the terms such as "first" and "second" are for distinguishing same items or similar items that have basically same functions. It should be understood that there is no logical or time sequence dependency between "first" and "second", and a quantity and an execution sequence are not limited. It should also be understood that although terms such as "first" and "second" are used in the following descriptions to describe various elements, these elements should not be limited by the terms. These terms are merely for distinguishing one element from another element. For example, without departing from the scope of various examples, a first gateway device may also be referred to as a second gateway device, and similarly, the second gateway device may be referred to as the first gateway device. Both the first gateway device and the second gateway device may be gateway devices, and in some cases, may be independent and different gateway devices.

The term "at least one" in this application means one or more, the term "a plurality of" in this application means two or more, and the terms "system" and "network" in this specification may be often used interchangeably.

It should be further understood that the term "if" may be interpreted as a meaning of "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely specific implementations of this application, but are not intended to limit the protection scope of this application. A person skilled in the art may readily figure out various equivalent modifications or replacements within the technical scope disclosed in this application, and these modifications or replacements shall fall within the protection scope of this application. Therefore, the protection scope of this application shall be subject to the protection scope of the claims.

All or some of the foregoing embodiments may be implemented by using software, hardware, firmware, or any combination thereof. When implemented by using software, all or some of the embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), or a semiconductor medium (for example, a solid state drive).

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, or an optical disc.

The foregoing embodiments are merely intended for describing the technical solutions of this application instead of limiting this application. Although this application is described in detail with reference to the foregoing embodiments, a person of ordinary skill in the art should understand that modifications can be still made to the technical solutions recorded in the foregoing embodiments or equivalent replacements can be made to some technical features thereof, without causing the essence of corresponding technical solutions to depart from the scope of the technical solutions of embodiments of this application.

What is claimed is:

1. A method, comprising:
obtaining, by a first gateway device, at least one traffic flow transmitted through the first gateway device;
obtaining, by the first gateway device, a malicious sample set and a normal sample set based on the at least one traffic flow, wherein a malicious sample comprised in the malicious sample set is metadata of a malicious traffic flow in the at least one traffic flow, and a normal sample comprised in the normal sample set is metadata of a normal packet flow in the at least one traffic flow;
screening, by the first gateway device, the malicious sample set and the normal sample set, to obtain a screened malicious sample set and a screened normal sample set, so that a quantity of malicious samples and a quantity of normal samples are balanced;
obtaining, by the first gateway device, a shared sample from a first server;
obtaining, by the first gateway device, a first model parameter from the first server;
performing, by the first gateway device, model training based on the screened malicious sample set, the shared sample, the first model parameter, and the screened normal sample set, to obtain a detection model after model training, wherein the first model parameter is a model parameter of the detection model in a current iteration sent from the first server to each gateway device participating in federated learning, the shared sample is a malicious sample provided by the first server for each gateway device in a gateway device set, the malicious sample of the malicious sample set is determined to be malicious prior to performing the model training, the gateway device set comprises the first gateway device, the detection model after model training is configured to be used by the first gateway device to detect whether one or more traffic flows transmitted through the first gateway device after the model training is malicious, and the detection model after model training comprises a second model parameter; and sending, by the first gateway device, the second model parameter of the detection model after model training to the first server; and receiving, by the first gateway device, a third model parameter from the first server, wherein the third model parameter is generated by aggregation processing performed on the second model parameter and another model parameter uploaded by a different gateway device.

2. The method according to claim 1, wherein the at least one traffic flow comprises a second traffic flow, and obtaining, by the first gateway device, the malicious sample set based on the at least one traffic flow comprises:

when the second traffic flow does not hit a blocking rule, inputting, by the first gateway device, metadata of the second traffic flow into a second detection model before the model training, wherein the blocking rule is configured to be used to block a malicious traffic flow, and when the model training performed by the first gateway device is a first time of model training, the second detection model is an initial detection model;

when an output result of the second detection model indicates that the second traffic flow is a suspicious traffic flow, analyzing, by the first gateway device, the second traffic flow; and when it is determined through analysis that the second traffic flow is a malicious traffic flow, determining, by the first gateway device, the metadata of the second traffic flow as the malicious sample of the malicious sample set.

3. The method according to claim 2, wherein analyzing, by the first gateway device, the second traffic flow comprises:

when a domain generation algorithm (DGA) event is generated in a first time period, determining, by the first gateway device, that the second traffic flow is a malicious traffic flow, wherein the first time period is a time period ending at a moment at which the first gateway device obtains the second traffic flow, an event source comprised in the DGA event is a first host, the first host is a source host of the second traffic flow, and the DGA event indicates that the first host accesses a DGA domain name.

4. The method according to claim 2, wherein analyzing, by the first gateway device, the second traffic flow comprises:

when an intranet brute force cracking event is generated in a second time period, determining, by the first gateway device, that the second traffic flow is a malicious traffic flow, wherein the second time period is a time period ending at a moment at which the first gateway device obtains the second traffic flow, the intranet brute force cracking event indicates that a brute force cracking attack targeting an intranet in which a first host is located occurs, and the first host is a source host of the second traffic flow;

when a sensitive information leakage event is generated in a second time period, determining, by the first gateway device, that the second traffic flow is a malicious traffic flow, wherein the second time period is a time period ending at a moment at which the first gateway device obtains the second traffic flow, and wherein the sensitive information leakage event indicates that a behavior of sending sensitive information on a first host to an external network occurs; or when an external network distributed denial of service (DDoS) event is generated in a second time period, determining, by the first gateway device, that the second traffic flow is a malicious traffic flow, wherein the second time period is a time period ending at a moment at which the first gateway device obtains the second traffic flow, and wherein the external network DDOS event indicates that a DDOS attack initiated by an intranet in which a first host is located to an external network occurs.

5. The method according to claim 2, wherein analyzing, by the first gateway device, the second traffic flow comprises:

when an output result of the second detection model in a third time period for metadata of a target traffic flow is periodic, determining, by the first gateway device, that the second traffic flow is a malicious traffic flow, wherein the third time period is a time period ending at a moment at which the first gateway device obtains the second traffic flow, the target traffic flow comprises at least one first host traffic flow that uses a first host as a source host, and the first host is a source host of the second traffic flow.

6. The method according to claim 1, wherein the at least one traffic flow comprises a third traffic flow, and obtaining, by the first gateway device, the malicious sample set based on the at least one traffic flow comprises:

when the third traffic flow does not hit a blocking rule and it is determined that the third traffic flow is not a malicious traffic flow, sending, by the first gateway device, context information of the third traffic flow to a second server, wherein the blocking rule is configured to be used to block a malicious traffic flow, and the context information comprises at least one of metadata of the third traffic flow or a packet capture (PCAP) packet of the third traffic flow;

receiving, by the first gateway device from the second server, an analysis result obtained based on the context information; and when the analysis result indicates that the third traffic flow is a malicious traffic flow, determining, by the first gateway device, the metadata of the third traffic flow as the malicious sample of the malicious sample set.

7. The method according to claim 1, wherein the at least one traffic flow comprises a third traffic flow, and obtaining, by the first gateway device, the malicious sample set based on the at least one traffic flow comprises:

when the third traffic flow does not hit a blocking rule and it is determined that the third traffic flow is not a malicious traffic flow, querying, by the first gateway device, first threat intelligence based on a destination Internet Protocol (IP) address comprised in the third traffic flow or a source IP address comprised in the third traffic flow, wherein the first threat intelligence comprises at least one malicious IP address, and when the destination IP address or the source IP address hits a malicious IP address in the first threat intelligence, determining, by the first gateway device, metadata of the third traffic flow as the malicious sample of the malicious sample set;

when the third traffic flow does not hit a blocking rule and it is determined that the third traffic flow is not a malicious traffic flow, querying, by the first gateway device, second threat intelligence based on a target domain name corresponding to the third traffic flow, wherein the target domain name is a domain name that the third traffic flow requests to access, and the second threat intelligence comprises at least one malicious domain name, and when the target domain name hits a malicious domain name in the second threat intelligence, determining, by the first gateway device, metadata of the third traffic flow as the malicious sample of the malicious sample set; or when the third traffic flow does not hit a blocking rule and it is determined that the third traffic flow is not a malicious traffic flow, querying, by the first gateway device, third threat intelligence based on a file identifier corresponding to the third traffic flow, wherein the file identifier identifies a file of the third traffic flow, and the third threat intelligence comprises at least one malicious file identifier, and when the file identifier hits a malicious file identifier in the third threat intelligence, determining, by the first gateway device, metadata of the third traffic flow as the malicious sample.

8. The method according to claim 1, wherein screening, by the first gateway device, the malicious sample set the first model parameter, and the normal sample set, to obtain the screened malicious sample set and the screened normal sample set, so that the quantity of malicious samples and the quantity of normal samples are balanced, comprises:

when a quantity of occurrence times of a same normal sample in a fourth time period exceeds a first threshold, removing, by the first gateway device, each occurrence time of the same normal sample from the normal sample set, wherein the fourth time period is a time period in which the first gateway device obtains the occurrence times of the same normal sample; and when a quantity of occurrence times of a same malicious sample in a fifth time period exceeds a second threshold, removing, by the first gateway device, each occurrence time of the same malicious sample from the malicious sample set, wherein the second threshold is less than the first threshold, and the fifth time period is a time period to in which the first gateway device obtains the occurrence times of the same malicious sample belongs.

9. A method, comprising:

determining, by a first server, a gateway device set participating in federated learning;

sending, by the first server, a hyperparameter and a shared sample to at least one gateway device in the gateway device set participating in the federated learning, wherein the shared sample is a malicious sample provided by the first server for each gateway device in the gateway device set participating in the federated learning, the hyperparameter comprises an initial parameter and a learning rate, the initial parameter is an initial parameter of a first detection model and a second detection model, and the learning rate is a learning rate of the first detection model and the second detection model for controlling a difference between a model parameter of the detection model before model training and after the model training;

receiving, by the first server, a first model parameter from a first gateway device in the gateway device set and a second model parameter from a second gateway device in the gateway device set, wherein the first model parameter is a parameter of the first detection model, the first detection model is configured to be used to detect whether a traffic flow transmitted through the first gateway device is malicious, the second model parameter is a parameter of the second detection model, and the second detection model is configured to be used to detect whether one or more traffic flows transmitted through the second gateway device is malicious;

performing, by the first server, aggregation processing based on the first model parameter and the second model parameter to obtain a third model parameter; and sending, by the first server, the third model parameter to at least one gateway device in the gateway device set so that a gateway device of the gateway device set is able to perform the model training by using the third model parameter obtained after the aggregation processing.

10. The method according to claim 9, wherein before sending, by the first server, the hyperparameter and the shared sample to the at least one gateway device in the gateway device set participating in federated learning, the method further comprises:

running, by the first server, a malicious file in a sandbox to obtain at least one packet capture (PCAP) packet; and generating, by the first server, the shared sample based on the at least one PCAP packet.

11. A first gateway device, comprising:

at least one processor; and at least one memory, coupled to the at least one processor and storing instructions that when executed by the at least one processor cause the first gateway device to:

obtain at least one traffic flow transmitted through the first gateway device;

obtain a malicious sample set and a normal sample set based on the at least one traffic flow, wherein a malicious sample comprised in the malicious sample set is metadata of a malicious traffic flow in the at least one traffic flow, and the normal sample comprised in the normal sample set is metadata of a normal packet flow in the at least one traffic flow;

screen the malicious sample set and the normal sample set, to obtain a screened malicious sample set and a screened normal sample set, so that a quantity of malicious samples and a quantity of normal samples are balanced;

obtain a shared sample from a first server;

obtain a first model parameter from the first server;

perform model training based on the screened malicious sample set, the shared sample, the first model parameter, and the screened normal sample set, to obtain a detection model after model training, wherein the first model parameter is a model parameter of the detection model in a current iteration sent from the first server to each gateway device participating in federated learning, the shared sample is a malicious sample provided by the first server for each gateway device in a gateway device set, the malicious sample of the malicious sample set is determined to be malicious prior to performing the model training based on the malicious sample set, the gateway device set comprises the first gateway device, and the detection model after model training is configured to be used by the first gateway device to detect whether one or more traffic flows transmitted through the first gateway device is malicious, and the detection model after model training comprises a second model parameter; and send the second model parameter of the detection model after model training to the first server; and receive a third model parameter from the first server, wherein the third model parameter is generated by aggregation processing performed on the second model parameter and another model parameter uploaded by a different gateway device.

12. The first gateway device according to claim 11, wherein the at least one traffic flow comprises a second traffic flow, and when executed by the at least one processor, the instructions further cause the first gateway device to:

when the second traffic flow does not hit a blocking rule, input metadata of the second traffic flow into a second detection model before the first gateway device performs model training, wherein the blocking rule is configured to be used to block a malicious traffic flow, and when the model training is performed by the first gateway device for a first time, the second detection model is an initial detection model;

when an output result of the second detection model indicates that the second traffic flow is a suspicious traffic flow, analyze the second traffic flow; and when it is determined through analysis that the second traffic flow is a malicious traffic flow, determine the metadata of the second traffic flow as the malicious sample of the malicious sample set.

13. The first gateway device according to claim 12, wherein when executed by the at least one processor, the instructions further cause the first gateway device to:

when a domain generation algorithm (DGA) event is generated in a first time period, determine that the second traffic flow is a malicious traffic flow, wherein the first time period is a time period ending at a moment at which the first gateway device obtains the second traffic flow, an event source comprised in the DGA event is a first host, the first host is a source host of the second traffic flow, and the DGA event indicates that the first host accesses a DGA domain name.

14. The first gateway device according to claim 12, wherein when executed by the at least one processor, the instructions further cause the first gateway device to:

when an intranet brute force cracking event is generated in a second time period, determine that the second traffic flow is a malicious traffic flow, wherein the second time period is a time period ending at a moment at which the first gateway device obtains the second traffic flow, the intranet brute force cracking event indicates that a brute force cracking attack targeting an intranet in which a first host is located occurs, and the first host is a source host of the second traffic flow;

when a sensitive information leakage event is generated in a second time period, determine that the second traffic flow is a malicious traffic flow, wherein the second time period is a time period ending at a moment at which the first gateway device obtains the second traffic flow, and wherein the sensitive information leakage event indicates that a behavior of sending sensitive information on a first host to an external network occurs; or when an external network distributed denial of service (DDoS) event is generated in a second time period, determine that the second traffic flow is a malicious traffic flow, wherein the second time period is a time period ending at a moment at which the first gateway device obtains the second traffic flow, and wherein the external network DDOS event indicates that a DDOS attack initiated by an intranet in which a first host is located to an external network occurs.

15. The first gateway device according to claim 12, wherein when executed by the at least one processor, the instructions further cause the first gateway device to:

when an output result of the second detection model in a third time period for metadata of a target traffic flow is periodic, determine that the second traffic flow is a malicious traffic flow, wherein the third time period is a time period ending at a moment at which the first gateway device obtains the second traffic flow, the target traffic flow comprises one or more traffic flows that use a first host as a source host, and the first host is a source host of the second traffic flow.

16. The first gateway device according to claim 11, wherein the at least one traffic flow comprises a third traffic flow, and when executed by the at least one processor, the instructions further cause the first gateway device to:

when the third traffic flow does not hit a blocking rule and it is determined that the third traffic flow is not a malicious traffic flow, send context information of the third traffic flow to a second server, wherein the blocking rule is configured to be used to block a malicious traffic flow, and the context information comprises at least one of metadata of the third traffic flow or a packet capture (PCAP) packet of the third traffic flow;

receive from the second server, an analysis result obtained based on the context information; and when the analysis result indicates that the third traffic flow is a malicious traffic flow, determine the metadata of the third traffic flow as the malicious sample of the malicious sample set.

17. The first gateway device according to claim 11, wherein the at least one traffic flow comprises a third traffic flow, and when executed by the at least one processor, the instructions further cause the first gateway device to:

when the third traffic flow does not hit a blocking rule and it is determined that the third traffic flow is not a malicious traffic flow, query first threat intelligence based on a destination Internet Protocol (IP) address comprised in the third traffic flow or a source IP address comprised in the third traffic flow, wherein the first threat intelligence comprises at least one malicious IP address, and when the destination IP address or the source IP address hits a malicious IP address in the first threat intelligence, determine metadata of the third traffic flow as the malicious sample of the malicious sample set;

when the third traffic flow does not hit a blocking rule and it is determined that the third traffic flow is not a malicious traffic flow, query second threat intelligence based on a target domain name corresponding to the third traffic flow, wherein the target domain name is a domain name that the third traffic flow requests to access, and the second threat intelligence comprises at least one malicious domain name, and when the target domain name hits a malicious domain name in the second threat intelligence, determine metadata of the third traffic flow as the malicious sample of the malicious sample set; or when the third traffic flow does not hit a blocking rule and it is determined that the third traffic flow is not a malicious traffic flow, query third threat intelligence based on a file identifier corresponding to the third traffic flow, wherein the file identifier identifies a file of the third traffic flow, and the third threat intelligence comprises at least one malicious file identifier; and when the file identifier hits a malicious file identifier in the third threat intelligence, determine metadata of the third traffic flow as the malicious sample of the malicious sample set.

* * * * *

UNITED STATES PATENT AND TRADEMARK OFFICE
CERTIFICATE OF CORRECTION

PATENT NO. : 12,375,521 B2  
APPLICATION NO. : 18/180960  
DATED : July 29, 2025  
INVENTOR(S) : Lijuan Jiao Page 1 of 1

It is certified that error appears in the above-identified patent and that said Letters Patent is hereby corrected as shown below:

In the Claims

In Column 52, in Claim 4, Line 19, delete "DDOS" and insert -- DDoS --.

In Column 52, in Claim 4, Line 20, delete "DDOS" and insert -- DDoS --.

In Column 53, in Claim 8, Lines 32-33, after "sample set" delete "the first model parameter,".

In Column 56, in Claim 14, Line 4, after "network" delete "DDOS" and insert -- DDoS --.

In Column 56, in Claim 14, Line 4, after "that a" delete "DDOS" and insert -- DDoS --.

Signed and Sealed this  
Second Day of September, 2025

Coke Morgan Stewart  
*Acting Director of the United States Patent and Trademark Office*